(12) United States Patent
Junge et al.

(10) Patent No.: US 10,598,998 B2
(45) Date of Patent: Mar. 24, 2020

(54) OPTICAL SWITCHING DEVICE

(71) Applicant: Merck Patent GmbH, Darmstadt (DE)

(72) Inventors: Michael Junge, Pfungstadt (DE); Andreas Beyer, Hanau (DE); Mila Fischer, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/628,923

(22) Filed: Jun. 21, 2017

(65) Prior Publication Data

US 2017/0371186 A1 Dec. 28, 2017

(30) Foreign Application Priority Data

Jun. 22, 2016 (EP) ..................... 16175747

(51) Int. Cl.
| | | |
|---|---|---|
| *G02F 1/137* | (2006.01) | |
| *E06B 9/24* | (2006.01) | |
| *G02F 1/1335* | (2006.01) | |
| *G02F 1/1337* | (2006.01) | |

(52) U.S. Cl.
CPC ............ *G02F 1/137* (2013.01); *E06B 9/24* (2013.01); *G02F 1/1337* (2013.01); *G02F 1/13737* (2013.01); *G02F 1/133528* (2013.01); *E06B 2009/247* (2013.01); *E06B 2009/2417* (2013.01); *E06B 2009/2464* (2013.01); *G02F 2001/133531* (2013.01); *G02F 2202/043* (2013.01); *G02F 2202/046* (2013.01)

(58) Field of Classification Search
CPC .................................................. C09K 19/60
See application file for complete search history.

(56) References Cited

U.S. PATENT DOCUMENTS

| | | | |
|---|---|---|---|
| 9,238,775 B2 | 1/2016 | Junge | |
| 2009/0027319 A1* | 1/2009 | Chen | G01J 1/4228 345/87 |
| 2016/0033807 A1* | 2/2016 | Junge | G02F 1/13725 349/16 |
| 2016/0085108 A1* | 3/2016 | Junge | G02F 1/1337 349/16 |
| 2016/0108317 A1* | 4/2016 | Kirsch | C09B 57/00 136/252 |
| 2016/0257885 A1* | 9/2016 | Junge | C09K 19/0208 |

FOREIGN PATENT DOCUMENTS

| | | | |
|---|---|---|---|
| WO | 12052100 A1 | 4/2012 | |
| WO | 2014/187529 A1 | 11/2014 | |
| WO | WO-2014187529 A1 * | 11/2014 | ............ C09B 57/00 |
| WO | 15117736 A1 | 8/2015 | |

OTHER PUBLICATIONS

Bjørn Petter Jelle; Fenestration of today and tomorrow: A state-of-the-art review and future research opportunities; Solar Energy Materials and Solar Cells; vol. 96, Jan. 2012, pp. 1-28.

European Search Report dated Oct. 27, 2017 issued in corresponding EP 17176576.1 application (9 pages).

Third Party Observations in EP17176576.1 dated Mar. 15, 2019 (24 Pages).

* cited by examiner

*Primary Examiner* — Chanceity N Robinson

(74) *Attorney, Agent, or Firm* — Millen White Zelano and Branigan, PC; John Sopp

(57) ABSTRACT

An optical switching device comprising a polarisation layer and a switching layer which comprises a liquid-crystalline material and a dye compound. Use of the optical switching device for the regulation of the passage of light through an area element. A window element which has the optical switching device therein.

28 Claims, No Drawings

OPTICAL SWITCHING DEVICE

The present application relates to an optical switching device which has a polarisation layer and a switching layer, where the switching layer comprises a liquid-crystalline material comprising a dichroic dye. The application furthermore relates to the use of the optical switching device for the regulation of the passage of light through an area element, in particular for the regulation of the incidence of light in a room element, for example a building interior or a vehicle interior.

For the purposes of the present application, the term light is taken to mean, in particular, electromagnetic radiation in the UV-A, VIS and NIR regions, i.e., in accordance with the usual definitions of light having a wavelength of 320 nm to 2000 nm.

The light whose passage is regulated by the device according to invention is preferably taken to mean sunlight. Sunlight preferably emanates directly from the sun. However, it may also emanate indirectly from the sun, for example via reflection, refraction, or via absorption and subsequent emission by any desired materials.

The device according to the invention is correspondingly preferably used to regulate the passage of sunlight through an area element, in particular to regulate the passage of sunlight through an area element into a substantially sealed-off space element. Devices of this type are also known under the generic term switchable windows or smart windows. These are reviewed, for example, in B. Jelle et al., Solar Energy Materials & Solar Cells 2012, pp. 1-28. The term switchable window here also encompasses switchable light-transmitting roofs, for example skylights or automobile roofs.

A variant of these switchable windows uses liquid-crystalline materials as materials for the switching layer. A multiplicity of different functional principles, for example the TN mode, the VA mode or the guest-host mode, are known for devices of this type which are based on switching by liquid-crystalline materials.

The said devices have a need for improvement in some respects. These include, in particular, the ability to block the passage of light as completely as possible, and preferably to do so not only in the case of a perpendicular view of the device, but instead also for the viewer from the side. Furthermore, the device should do this in the broadest possible temperature range. Again furthermore, the device should be long-term stable, in particular on intense exposure to light, in particular UV light, and to heat.

Devices known to the person skilled in the art which are based on liquid-crystalline materials in the switching layer and which block the passage of light as completely as possible are, in particular, devices based on the TN mode and the VA mode which do not comprise dyes in the switching layer. For switchable windows which are intended to be capable of blocking the passage of light as completely as possible, LC cells, in particular, having the above-mentioned TN and VA modes are therefore obvious choices from the point of view of the person skilled in the art. However, these have some disadvantages, inter alia high temperature sensitivity. In addition, the blocking of the light in the case of the said modes only occurs at certain angles at which the device is viewed. This is undesired for use in windows, since switchable windows, unlike displays, are not viewed at a substantially constant viewing angle. In addition, light which hits a switchable window at an angle for which only a low blocking action by the LC cell occurs contributes to heating of the interior, so that the dark switching state of the switchable window does not block the input of energy by sunlight into an interior as effectively as desired.

In the search for a solution to this situation, it has now been found, surprisingly, that a device having a particular design, comprising a polarisation layer and a switching layer, where the switching layer comprises a liquid-crystalline material and a dichroic dye, has the desired properties mentioned above.

The present application thus relates to an optical switching device comprising a polarisation layer, and
arranged parallel to the polarisation layer, a switching layer comprising a liquid-crystalline material comprising at least one dichroic dye, where the switching layer has a dark switching state having low transmission through the switching layer and a bright switching state having high transmission through the switching layer, where the light transmittance $\tau_v$, in accordance with the EN410 standard, of the switching layer in the dark switching state of the device, i.e., the low light transmittance, for light which is polarised parallel to the principal axis of absorption of the at least one dichroic dye is preferably less than 5%. The light transmittance $\tau_v$, in accordance with the EN410 standard, of the switching layer in the bright switching state of the device i.e., the high light transmittance, for light which is polarised parallel to the principal axis of absorption of the at least one dichroic dye is preferably at least 15%, more preferably at least 20%. In this respect, generally the polarization orientation in both the dark state and the bright state stays fixed, while the orientation of the dye molecules changes from a relative parallel alignment in the dark state to a respectively perpendicular alignment in the bright state. However, a type of bright state may be obtainable for an incomplete switching where the dye orientation is not perfectly perpendicular. Alternatively, the high light transmittance, in which light is polarized essentially perpendicular, more preferably perpendicular, to the principal axis of absorption of the at least one dichroic dye in the bright switching state, is preferably at least 15%, more preferably at least 20%.

The light transmittance $\tau_v$ is determined as indicated in the corresponding standard EN410, Equation (1). It is determined from the measured spectral transmittances taking into account the relative spectral distribution of the standard illuminant and the spectral brightness sensitivity of the standard observer. It is quoted in percent, relative to an otherwise identical switching layer without dye in the switching layer as reference, i.e. corresponds to the quotient of the light intensity passing through the switching layer comprising dyes (numerator) and the intensity of a reference beam passing through a switching layer of the same construction without dyes (denominator). For the purposes of the present application, the light transmittance $\tau_v$ is the light transmittance at a temperature of 20° C. The precise method for the determination of $\tau_v$ is indicated in the working examples.

EN 410 is the European CSN standard for determination of luminous and solar characteristics of glazing/glass in building. This European Standard specifies methods of determining the luminous and solar characteristics of glazing in buildings. These characteristic can serve as a basis for lighting, heating and cooling calculations of rooms and permit comparison between different types of glazing.

A liquid-crystalline material here is taken to mean a material which exhibits liquid-crystalline properties in at least one temperature range. This is preferably taken to mean a temperature range within a span from −50° C. to 200° C., particularly preferably within a span from −30° C. to 150° C. Liquid-crystalline properties are preferably taken to mean nematically liquid-crystalline properties.

The principal axis of absorption of the at least one dichroic dye is, in the case of positively dichroic dyes, taken to mean the axis parallel to which the compound has the greatest dimension (longitudinal axis). Correspondingly, in the case of negatively dichroic dyes it is taken to mean the axis perpendicular to which the compound has the greatest dimension (transverse axis).

The device preferably has a light transmittance in the dark switching state, i.e., the low light transmittance, determined in accordance with the EN410 standard, of less than 5%, particularly preferably less than 3%, very particularly preferably less than 2%, and most preferably less than 1%. The light transmittance of the device is determined as indicated in the working examples and relates to a device temperature of 20° C.

The light transmittance $\tau_v$ of the switching layer in the dark switching state, i.e., the low light transmittance, of the device for light which is polarised parallel to the principal axis of absorption of the at least one dichroic dye is preferably less than 4%, particularly preferably less than 3% and very particularly preferably less than 2%.

The device preferably has the following layer sequence, where further layers may additionally be present. The layers indicated below are preferably directly adjacent to one another in the device:
  polarisation layer
  substrate layer, preferably comprising glass or polymer
  electrically conductive transparent layer, preferably comprising ITO
  alignment layer
  switching layer comprising a liquid-crystalline material and at least one dichroic dye
  alignment layer
  electrically conductive transparent layer, preferably comprising ITO
  substrate layer, preferably comprising glass or polymer.

In principle, all products known to the person skilled in the art can be employed for the polarisation layer. Polarisers in the form of thin optical films are preferably used. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF (advanced polariser film, 3M, cf. Technical Digest SID 2006, 45.1, US 2011/0043732 and U.S. Pat. No. 7,023,602). Furthermore, wire-grid polarisers (WGPs) can be employed. Examples of absorptive polarisers which can be employed in the devices according to the invention are the Itos XP38 polariser film, the Nitto Denko GU-1220DUN polariser film and the Itos XP40HT polariser film.

The polarisation layer is preferably formed from a material which comprises one or more different organic compounds which have a common fixed spatial alignment and which absorb light in the visible region, such as, for example, in the XP40HT polariser film. The polarisation layer is particularly preferably formed from a material which comprises one or more different organic dye compounds which have a common fixed spatial alignment. The dye compounds in this case are preferably present in the layer in a mixture with an oriented polymer, which can be obtained, for example, by stretching, or in a mixture with a liquid-crystalline material. Examples of polarisers of this type are disclosed in Thulstrup et al., Spectrochimica Acta 1988, 8, 767-782, and in WO 2013/097919 in the working examples. It has been found that a polarisation layer of this type enables switching devices to be obtained which are very long-term stable, in particular on intense exposure to sunlight and/or at high temperatures. Furthermore, it is possible to use a polarisation layer which consists of a wire grid (WGP, wire-grid polariser). Devices having a very long service life can thus likewise be obtained. As a further alternative, it is possible to use a polarisation layer which comprises a stretched polymer, preferably PVA, and iodine included therein.

The polarisation layer of the device according to the invention is preferably highly effective, i.e. it polarises light to a very high proportion. In particular, it is preferred that the polarisation layer has a degree of polarisation of greater than 95%, particularly preferably greater than 98%, very particularly preferably greater than 99%, in each case at a light wavelength of 550 nm. The degree of polarisation is defined here as the quotient between the difference in transmission in the passage direction and transmission in the blocking direction and the sum of transmission in the passage direction and transmission in the blocking direction. This corresponds to the equation $$P=(T1-T2)/(T1+T2),$$

where P is the degree of polarisation, T1 is the transmission in the passage direction and T2 is the transmission in the blocking direction.

The device preferably comprises precisely one polarisation layer. This is preferably arranged on the side of the switching layer facing outwards, i.e. between the light source, in particular the sun, and the switching layer.

The polarisation layer preferably linearly polarises light.

The absorption axis of the polarisation layer which linearly polarises light is, in the dark switching state of the switching layer, preferably arranged at an angle of 70°-110° to the principal axis of absorption of the at least one dichroic dye. The absorption axis of the polarisation layer which linearly polarises light is, in the dark switching state of the switching layer, particularly preferably arranged at an angle of 80°-100° to the principal axis of absorption of the at least one dichroic dye, very particularly preferably at an angle of 85°-95°, most preferably at an angle of 90°.

The absorption axis of the polarisation layer is taken to mean the axis within the plane of the polarisation layer for which light polarised parallel to the axis is absorbed to a predominant proportion. Light polarised perpendicular to the absorption axis is, by contrast, not absorbed to a predominant proportion, but instead is allowed to pass through. The absorption axis of the polarisation layer is perpendicular to the so-called passage direction of the polarisation layer.

The device according to the invention preferably comprises one or more, particularly two alignment layers. The alignment layers are preferably directly adjacent to the two sides of the switching layer.

Alignment layers which can be used in the device according to the invention are any desired layers which are known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline material in the rubbing direction if the molecules are parallel to the alignment layer (planar alignment). It is preferred here that the molecules of the liquid-crystalline material are not in completely planar form on the alignment layer, but instead have a slight pre-tilt angle. In order to achieve vertical alignment of the molecules to the surface of the alignment layer (homeotropic alignment), polyimide treated in a certain manner is preferably employed as material for the alignment layer (polyimide for very high pre-tilt angles). Furthermore, polymers obtained by exposure to polarised light can be used as alignment layer in order to achieve alignment of the molecules in accordance with an alignment axis (photoalignment). Illustrative materials consist of polyacrylates or also of cinnamic acids containing polymerisable groups, such as acrylates.

It is preferred that the alignment directions of the two alignment layers surrounding the switching layer in the device according to invention enclose an angle of 0° to 270°.

The term alignment direction here is taken to mean the direction in which the alignment layer aligns the molecules of the switching layer. This can be, for example, depending on the type of production of the alignment layer, the rubbing direction or the alignment direction of the polymer in the case of photoalignment.

The switching layer preferably has a thickness between 1 μm and 150 μm, particularly preferably between 2 and 15 μm, very particularly preferably between 5 and 10 μm. Thinner switching layers in the present application with flexible substrates result in more stable devices, in particular undesired movement of the spacers relative to the substrate layers occurs less easily.

The switching layer is preferably switched by application of an electric voltage and consequently the formation of an electric field within the switching layer. The voltage is preferably applied here to electrodes which are applied to both sides of the switching layer comprising the liquid-crystalline material. The electrodes preferably consist of ITO or of a thin, preferably transparent metal and/or metal oxide layer, for example comprise silver or an alternative material known to the person skilled in the art for this purpose. The electrodes are preferably provided with electrical connections. The power supply is preferably provided by a battery, a rechargeable battery, a supercapacitor or by an external power supply.

The switching by application of an electric voltage preferably takes place here from a dark switching state without electric voltage to a bright switching state with electric voltage. The term dark switching state here is taken to mean a switching state in which only little light is allowed to pass through the device, i.e. its transmission is low. The term bright switching state is correspondingly taken to mean a switching state in which more light is allowed to pass through the device, i.e. its transmission is relatively high.

The liquid-crystalline material of the switching layer is preferably nematic in both switching states. The voltage-free state is preferably characterised in that the molecules of the liquid-crystalline material, and thus of the at least one dichroic dye, are aligned parallel to the alignment layers. This is preferably achieved by a correspondingly selected alignment layer. The state under voltage is preferably characterised in that the molecules of the liquid-crystalline material, and thus the dichroic dyes, are perpendicular to the alignment layers.

In an alternative embodiment, the device is converted from a bright switching state, which is present without voltage, into a dark switching state by application of a voltage. The liquid-crystalline material is preferably nematic in both states. The voltage-free state is preferably characterised in that the molecules of the liquid-crystalline material, and thus the dichroic dyes, are aligned perpendicular to the alignment layers. This is preferably achieved by a correspondingly selected alignment layer. The state under voltage is then preferably characterised in that the molecules of the liquid-crystalline material, and thus the dichroic dyes, are aligned parallel to the alignment layers.

The alignment of the molecules of the liquid-crystalline material of the switching layer in the planar state, which preferably corresponds to the dark switching state of the switching layer, is preferably either the same over the entire thickness of the switching layer, or it has a twist within the switching layer. Preferred values for the twist are between 30° and 360°, particularly preferably between 90° and 270°. If it has a twist, this twist preferably has a value which is a multiple of 90°. Particularly preferred values for the twist are 90°, 180° or 270°. The twist is achieved by the alignment directions on the alignment layers used which are adjacent to the switching layer forming a corresponding angle to one another. In the case of a twist, it is furthermore preferred that the liquid-crystalline material of the switching layer comprises a chiral dopant.

Chiral dopants are preferably employed in the liquid-crystalline material in a total concentration of 0.01% by weight to 3% by weight, particularly preferably from 0.05% by weight to 1% by weight. In order to obtain high values for the twist, the total concentration of the chiral dopants may also be selected higher than 3% by weight, preferably up to a maximum of 10% by weight.

Preferred dopants are the compounds depicted in the following table:

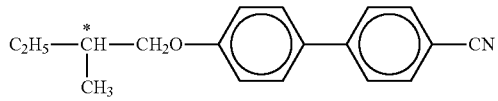

DP-1

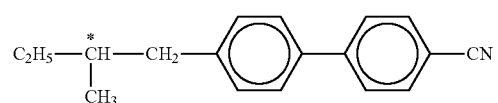

DP-2

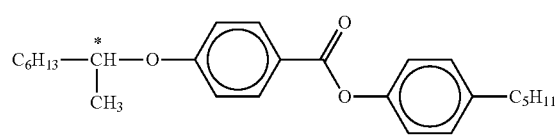

DP-3

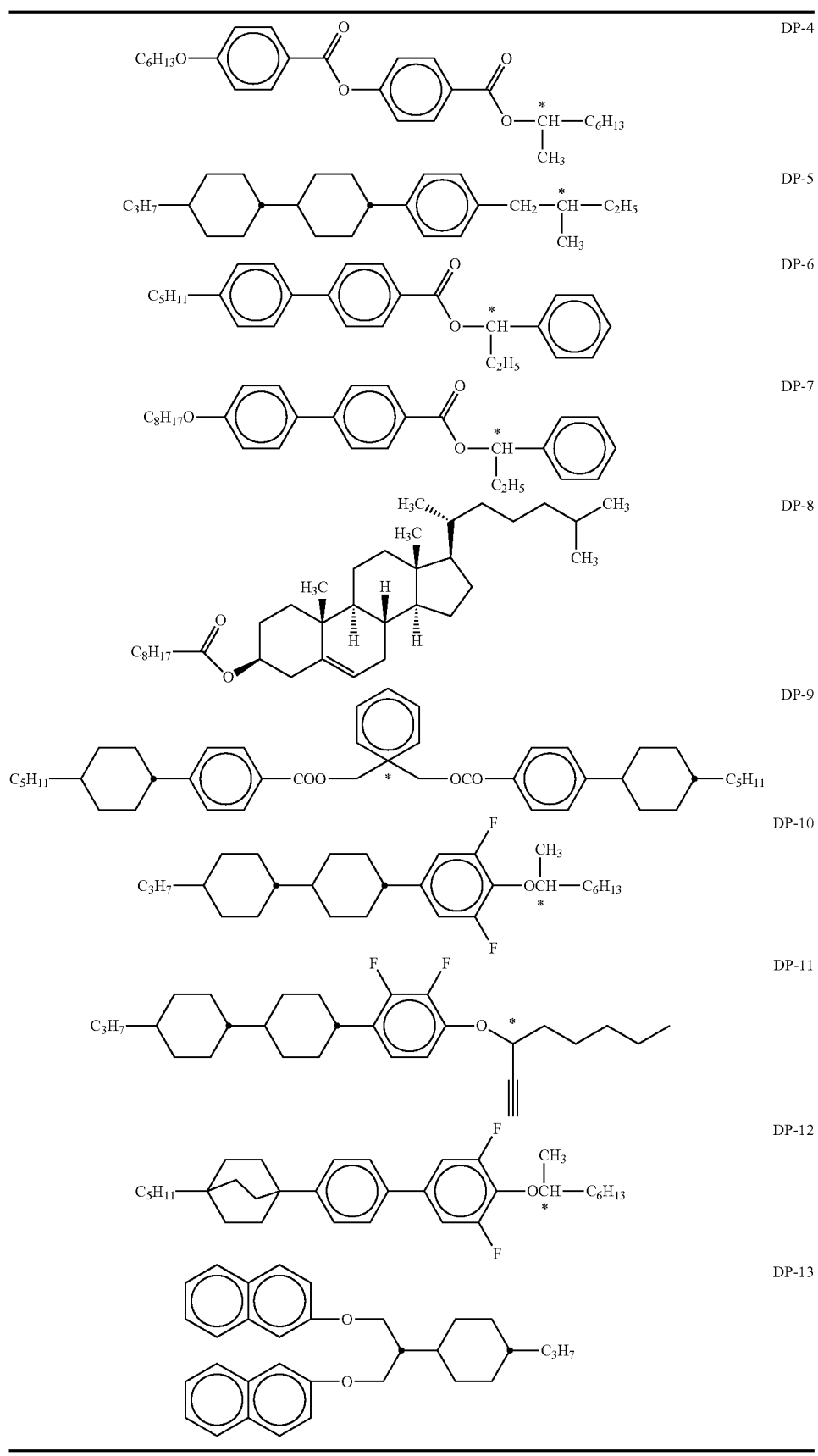

The liquid-crystalline material of the switching layer furthermore preferably comprises one or more stabilisers. The total concentration of the stabilisers is preferably between 0.00001% by weight and 10% by weight, particularly preferably between 0.0001% by weight and 1% by weight of the entire liquid-crystalline material.

Preferred stabilisers are shown in the following table:

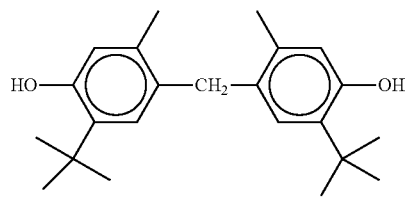

ST-1

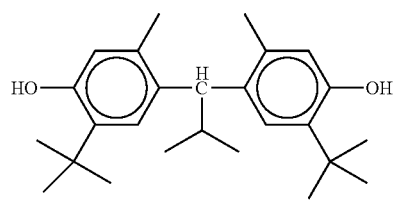

ST-2

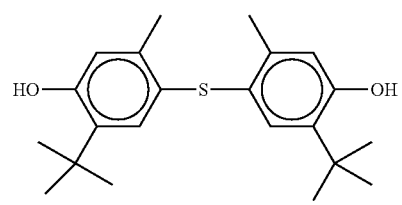

ST-3

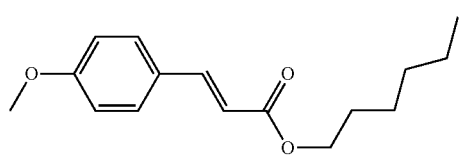 [SMILES: CCCCCCOC(=O)/C=C/c1ccc(OC)cc1]

ST-4

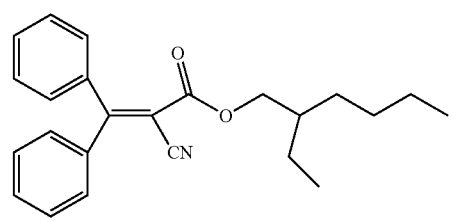 [SMILES: CCCCC(CC)COC(=O)C(C#N)=C(c1ccccc1)c1ccccc1]

ST-5

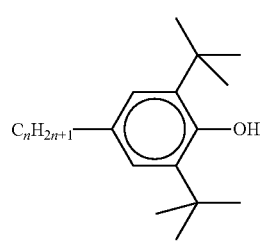

ST-6

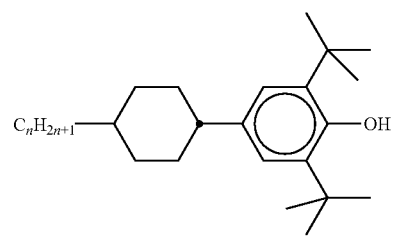

ST-7

-continued
ST-8
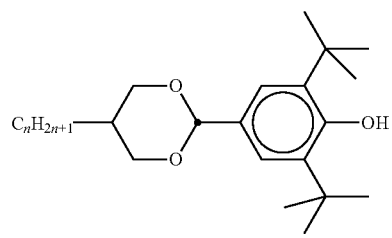
ST-9
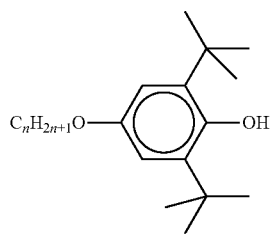
ST-10
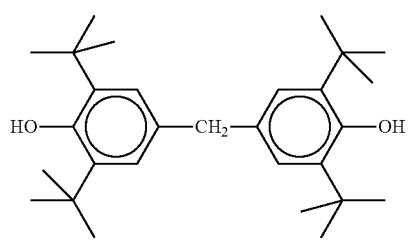
ST-11
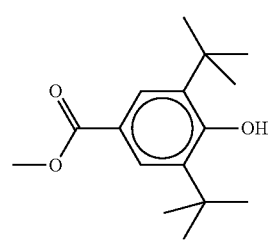
ST-12
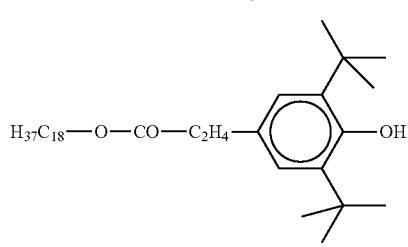
ST-13
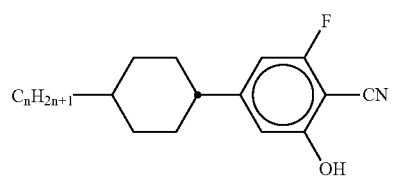
ST-14
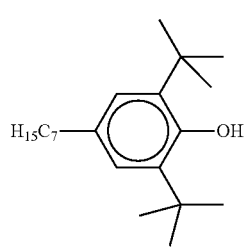

-continued
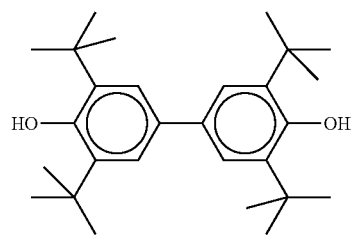
ST-15
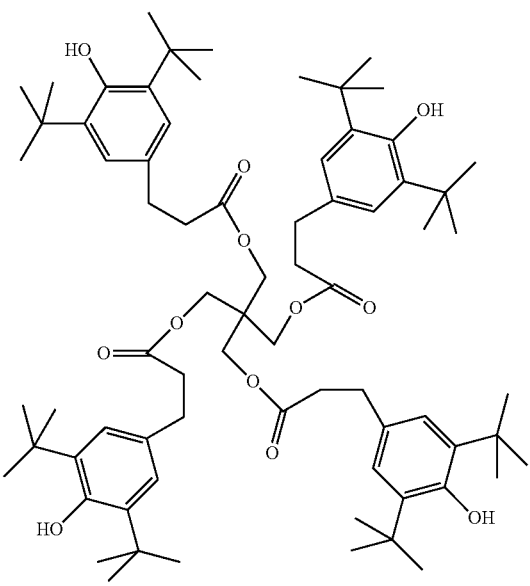 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
ST-16
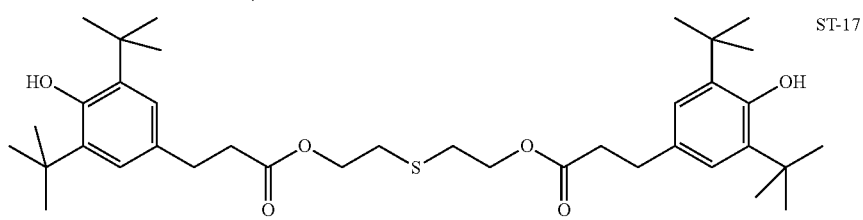
ST-17
ST-18
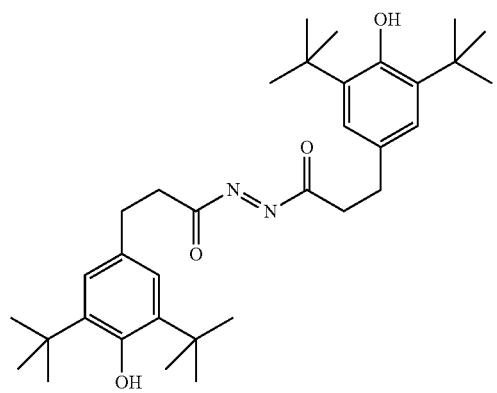 [SMILES: CC(C)(C)c1cc(CCC(=O)/N=N/C(=O)CCc2cc(C(C)(C)C)c(O)c(C(C)(C)C)c2)cc(C(C)(C)C)c1O]

-continued
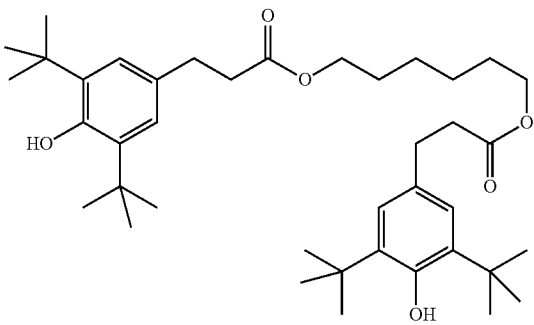 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
ST-19
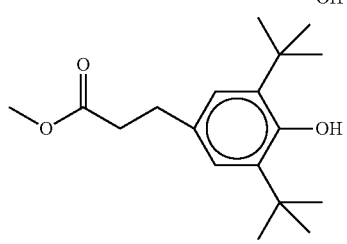
ST-20
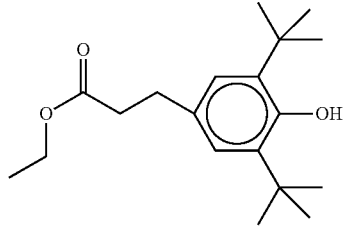
ST-21
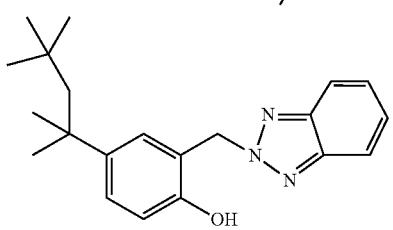
ST-22
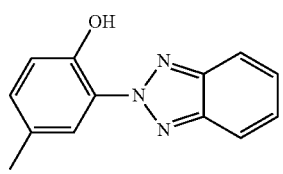 [SMILES: Cc1ccc(O)c(-n2nc3ccccc3n2)c1]
ST-23
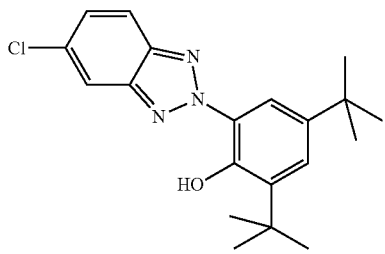 [SMILES: CC(C)(C)c1cc(-n2nc3ccc(Cl)cc3n2)c(O)c(C(C)(C)C)c1]
ST-24
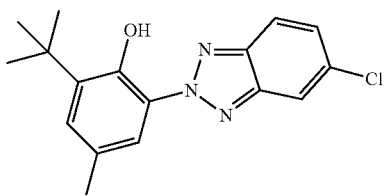 [SMILES: Cc1cc(-n2nc3ccc(Cl)cc3n2)c(O)c(C(C)(C)C)c1]
ST-25

-continued
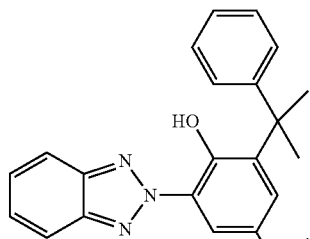
ST-26
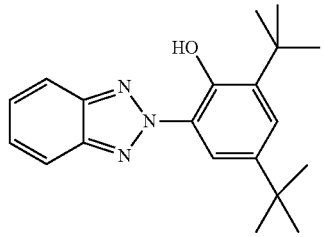 [SMILES: CC(C)(C)c1cc(-n2nc3ccccc3n2)c(O)c(C(C)(C)C)c1]
ST-27
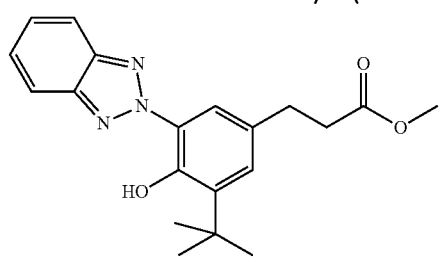
ST-28
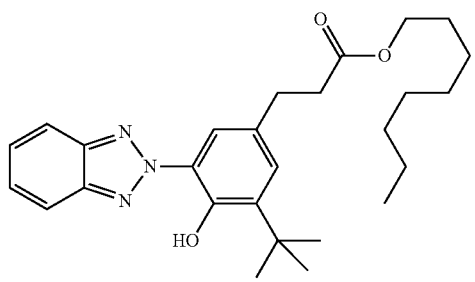 [SMILES: CCCCCCCCOC(=O)CCc1cc(-n2nc3ccccc3n2)c(O)c(C(C)(C)C)c1]
ST-29
ST-30
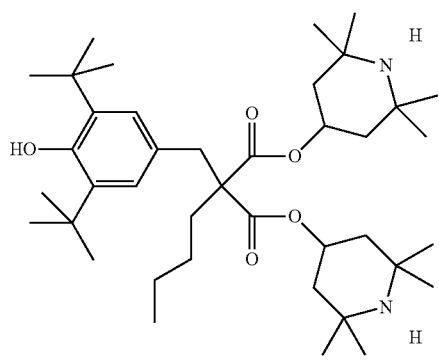

-continued
ST-31
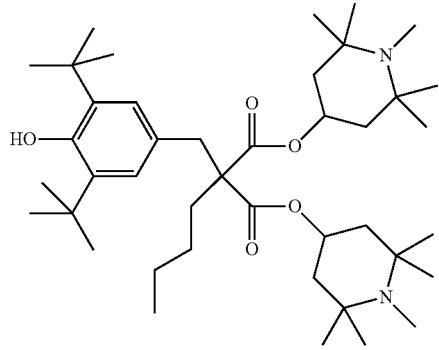 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
ST-32
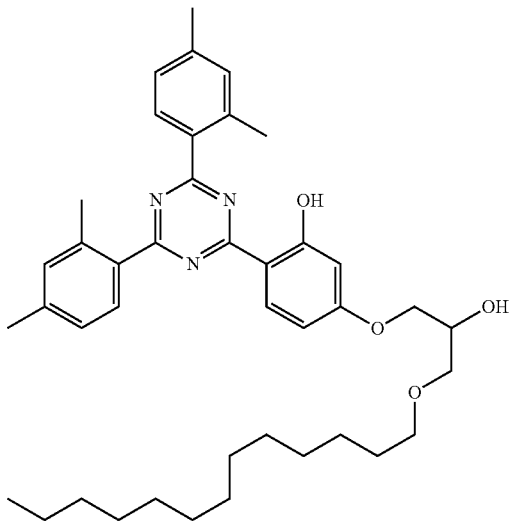 [SMILES: CCCCCCCCCCCCCOCC(O)COc1ccc(-c2nc(-c3ccc(C)cc3C)nc(-c3ccc(C)cc3C)n2)c(O)c1]
ST-33
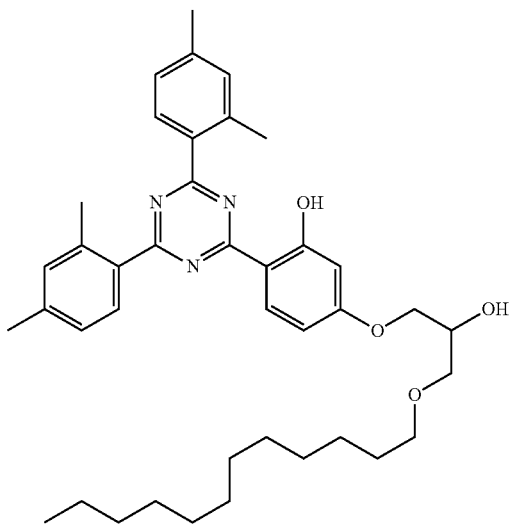 [SMILES: CCCCCCCCCCCCOCC(O)COc1ccc(-c2nc(-c3ccc(C)cc3C)nc(-c3ccc(C)cc3C)n2)c(O)c1]

-continued
ST-34
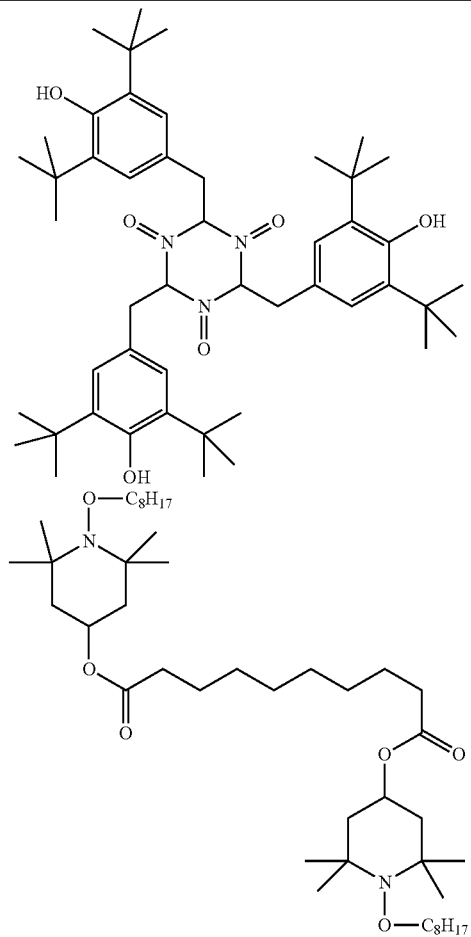
ST-35
ST-36
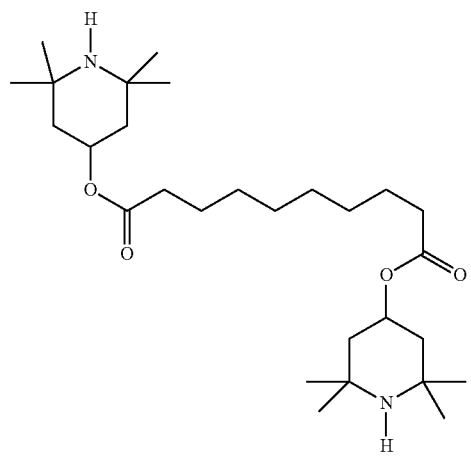

-continued
ST-37
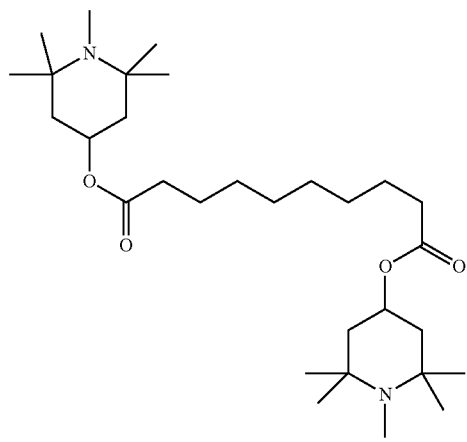
ST-38
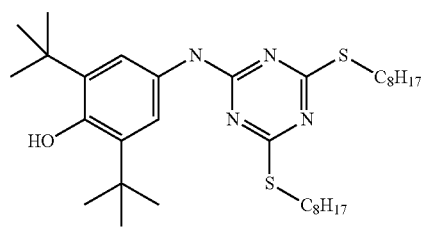
ST-39
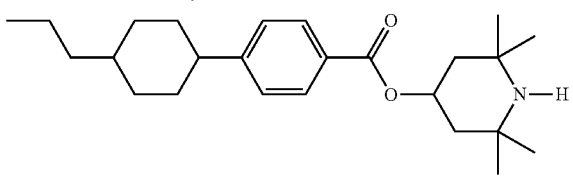
ST-40
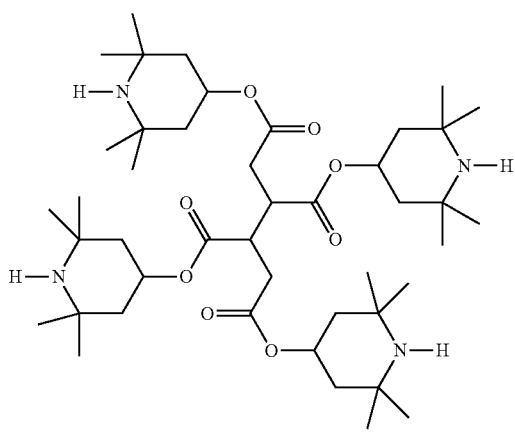 [SMILES: CC1(C)CC(OC(=O)CC(C(=O)OC2CC(C)(C)NC(C)(C)C2)C(CC(=O)OC2CC(C)(C)NC(C)(C)C2)C(=O)OC2CC(C)(C)NC(C)(C)C2)CC(C)(C)N1]
ST-41
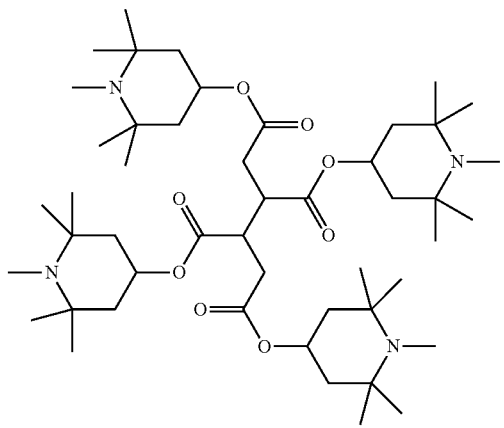

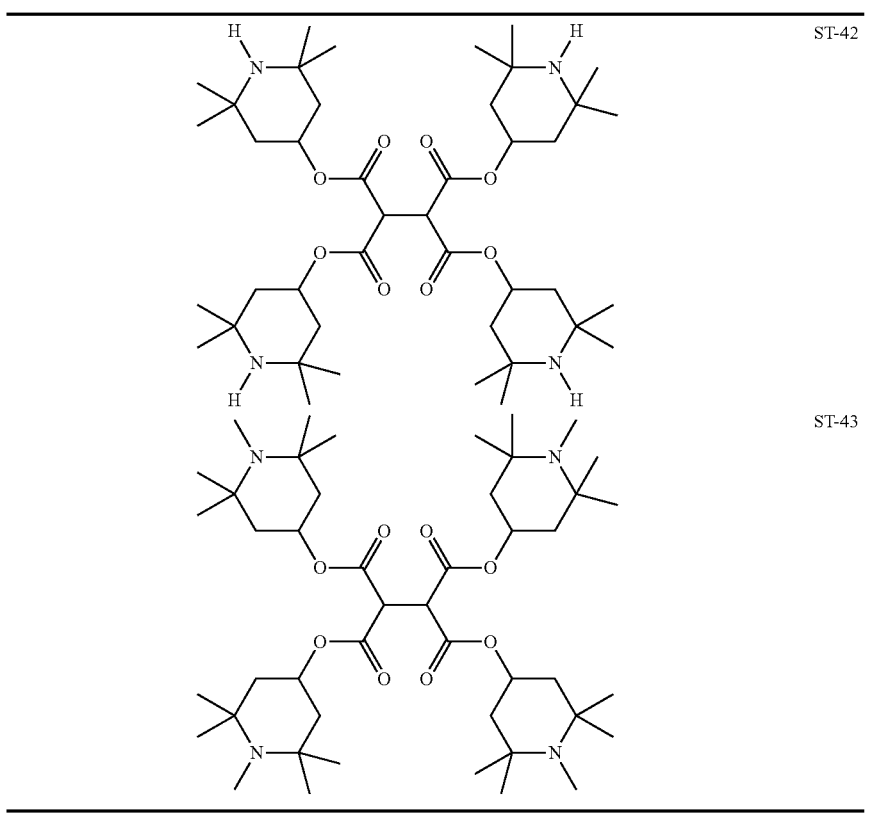

The device is preferably characterised in that the switching layer comprises at least two different dichroic dyes, particularly preferably precisely 2, 3, 4, 5 or 6 different dichroic dyes, very particularly preferably precisely 2, 3 or 4 different dichroic dyes. The dichroic dyes are preferably organic compounds.

It is furthermore preferred that at least one of the dichroic dyes is luminescent, preferably fluorescent.

The absorption spectra of the dichroic dyes in the liquid-crystalline medium preferably complement one another in such a way that the impression of a black colour of the device arises for the eye. The device is particularly preferably colourless when looked through in all its switching states, where a grey or black impression is likewise regarded as colourless.

The two or more dichroic dyes of the liquid-crystalline material preferably cover a large part of the visible spectrum. This is preferably achieved by at least one dichroic dye absorbing red light, at least one absorbing green to yellow light and at least one absorbing blue light.

The precise way in which a mixture of dichroic dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, published by Walter de Gruyter & Co.

Furthermore, the dichroic dyes preferably absorb predominantly light in the UV-VIS-NIR region, i.e., in a wavelength range from 320 to 2000 nm. UV light, VIS light and NIR light here are defined as above. The dichroic dyes particularly preferably have absorption maxima which are in the range from 400 to 1300 nm.

The total proportion of the dichroic dyes in the liquid-crystalline material is preferably 0.01 to 20% by weight, particularly preferably 0.1 to 15% by weight and very particularly preferably 0.2 to 12% by weight. The proportion of each individual one of the one or more dyes is preferably 0.01 to 15% by weight, preferably 0.05 to 12% by weight and very particularly preferably 0.1 to 10% by weight.

The at least one dichroic dye is preferably dissolved in the liquid-crystalline material. The dye is preferably influenced in its alignment by the alignment of the molecules of the liquid-crystalline material.

The at least one dichroic dye is preferably selected from the classes of compound indicated in B. Bahadur, Liquid Crystals—Applications and Uses, Vol. 3, 1992, World Scientific Publishing, section 11.2.1, and particularly preferably from the explicit compounds indicated in the table present therein.

The at least one dichroic dye is preferably selected from azo compounds, anthraquinones, methine compounds, azomethine compounds, merocyanine compounds, naphthoquinones, tetrazines; rylenes, in particular perylenes and terrylenes; benzothiadiazoles, pyrromethenes and diketopyrrolopyrroles. Of these, particular preference is given to azo compounds, anthraquinones, benzothiadiazoles, in particular as disclosed in WO 2014/187529, diketopyrrolopyrroles, in particular as disclosed in WO 2015/090497, and rylenes, in particular as disclosed in WO 2014/090373. The at least one dichroic dye is very particularly preferably selected from azo dyes, benzothiadiazole dyes and rylene dyes.

The following compounds are examples of preferred dichroic dyes:

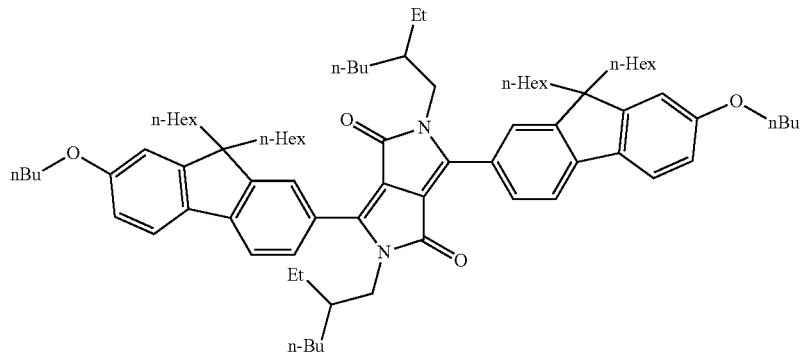
1
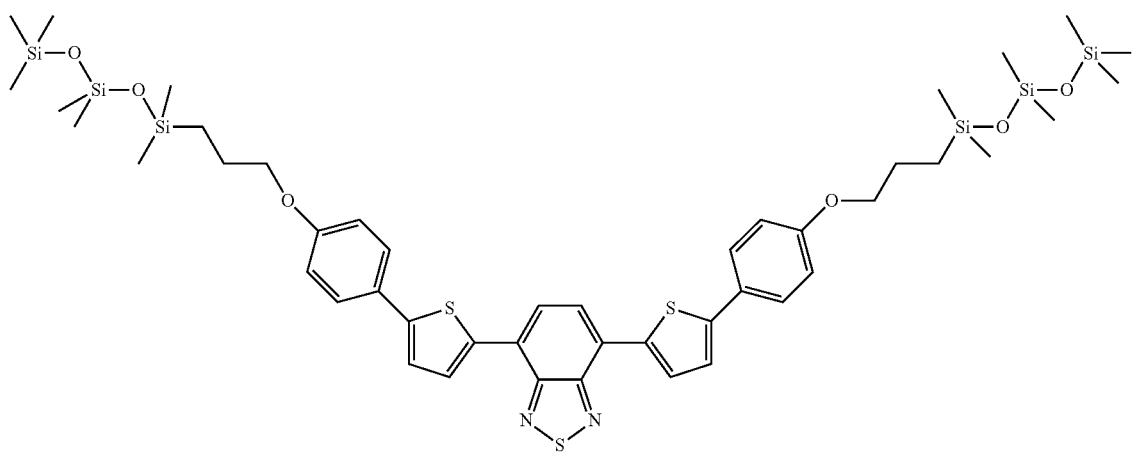
2
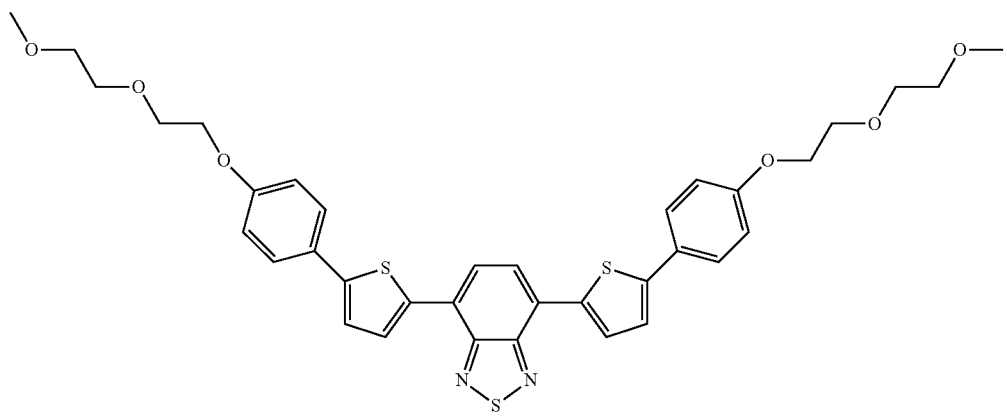
3
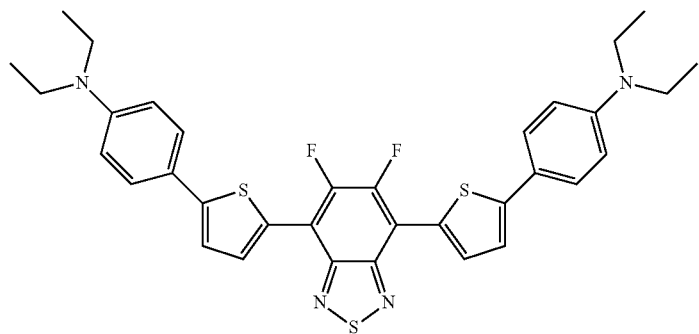
4

5
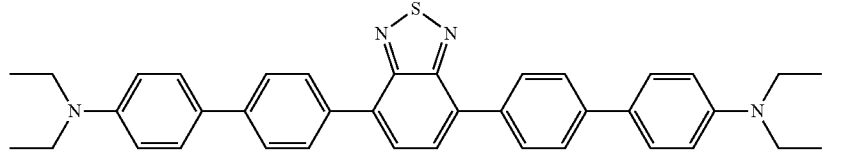
6
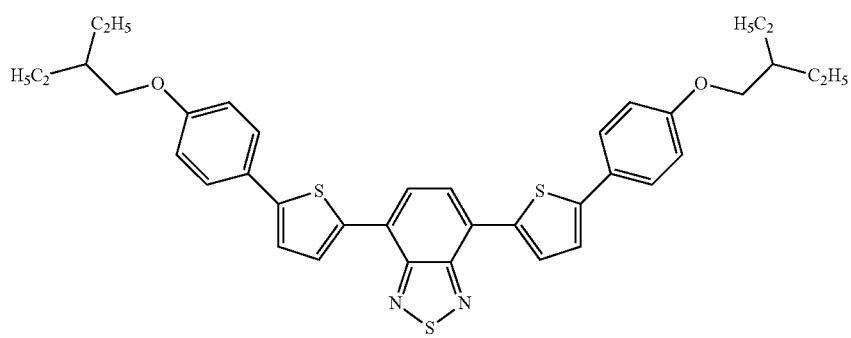
7
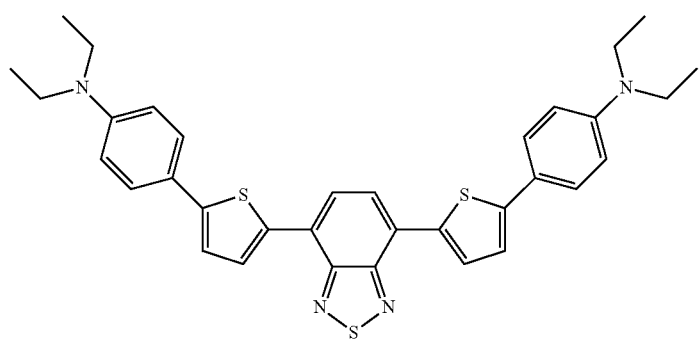
8
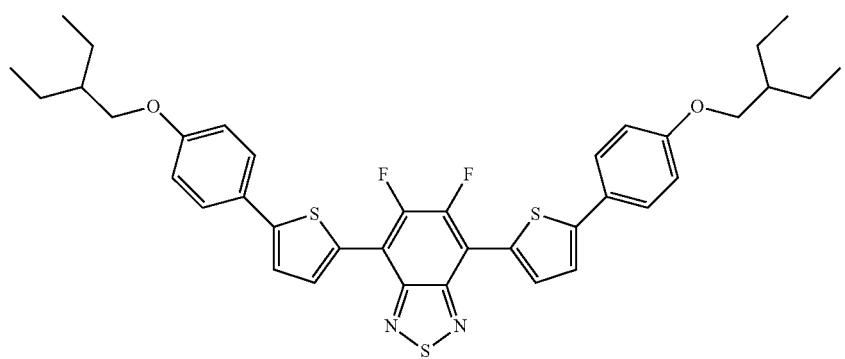
9
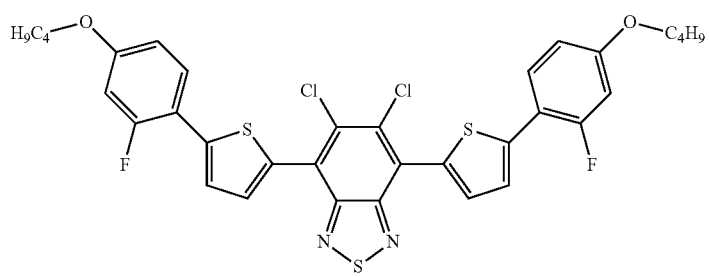

-continued
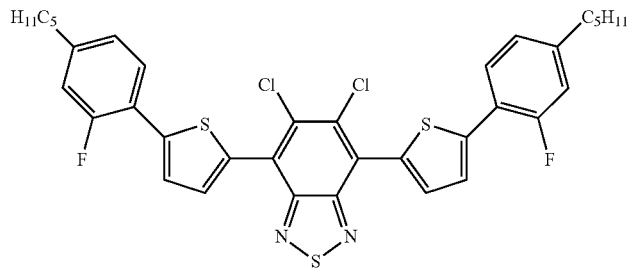
10
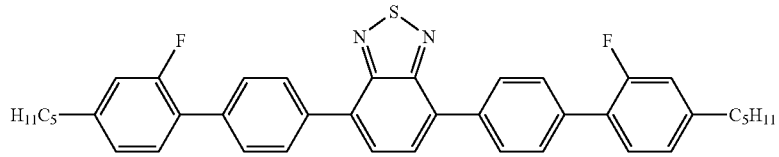
11
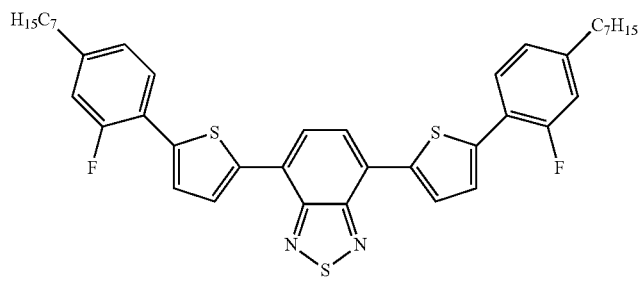
12
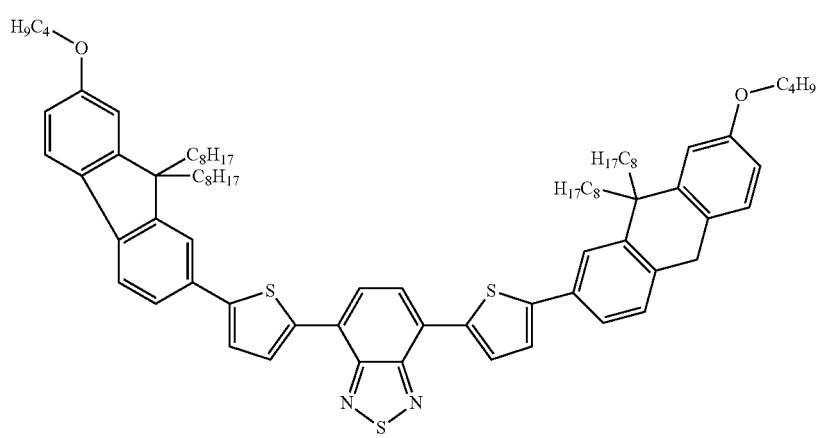
13
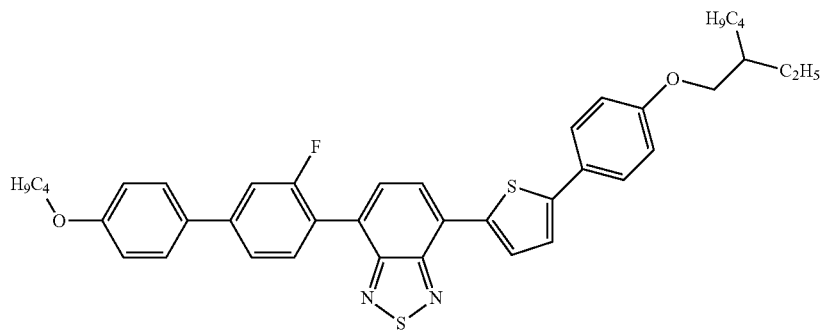
14

-continued
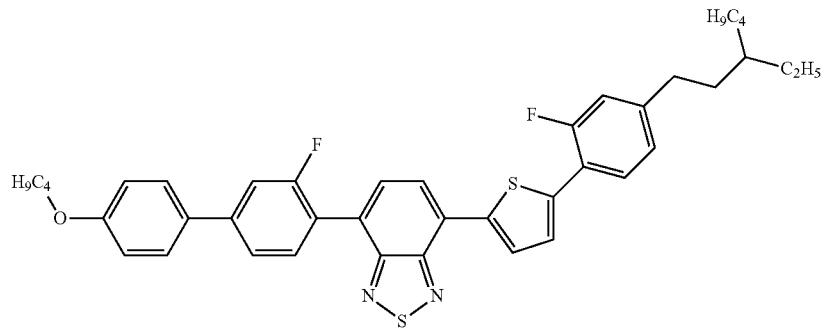
15
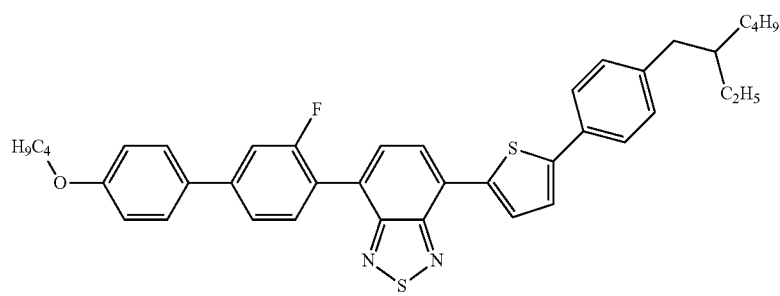
16
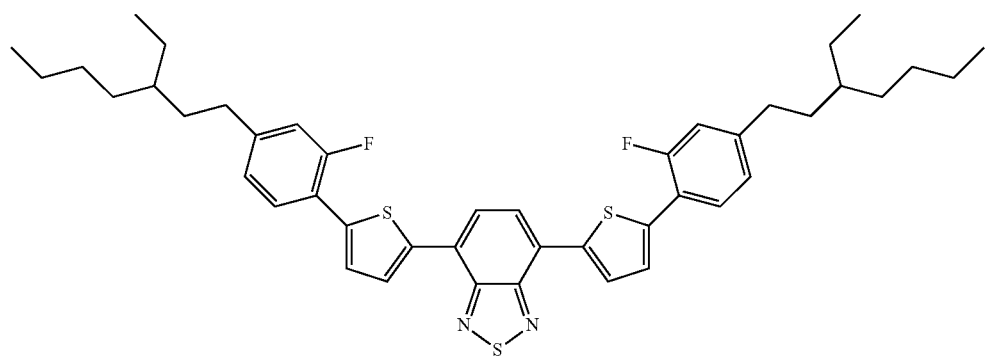
17
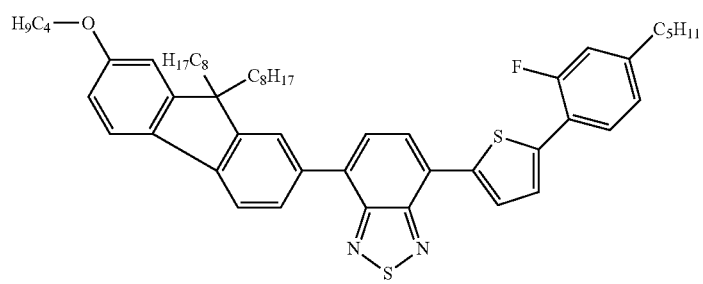
18
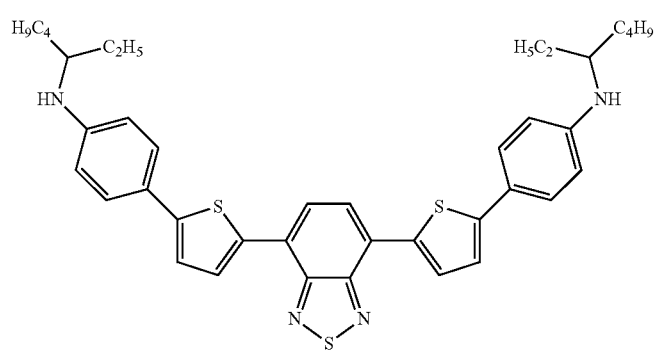
19

20
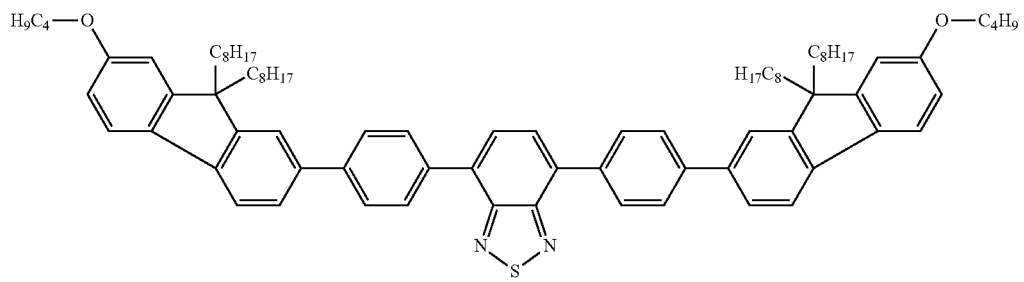
21
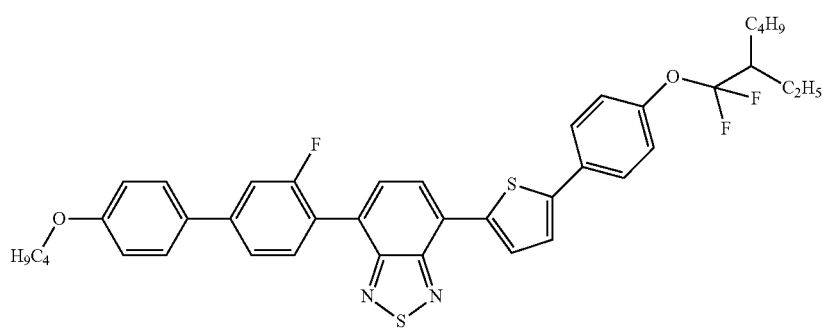
22
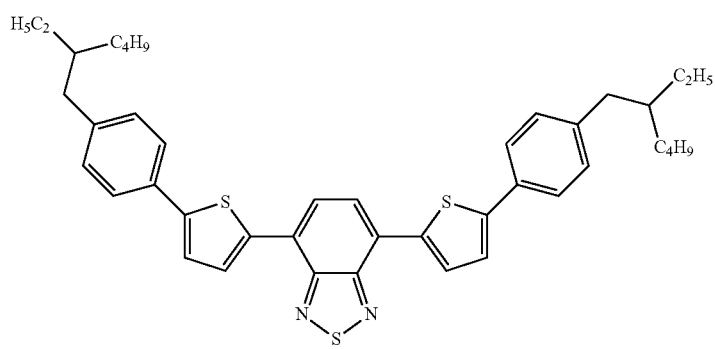
23
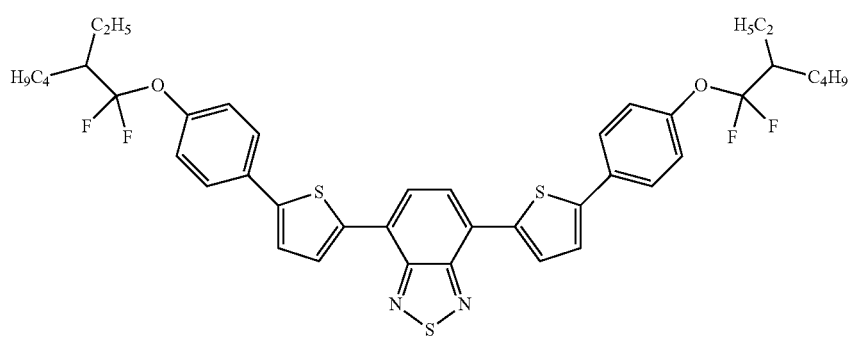
24
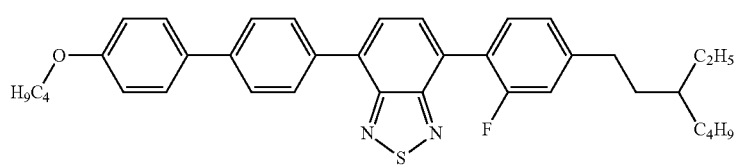

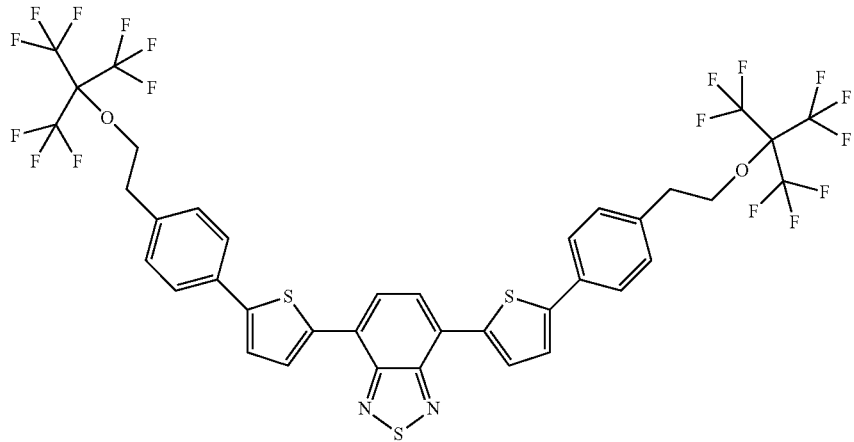
25
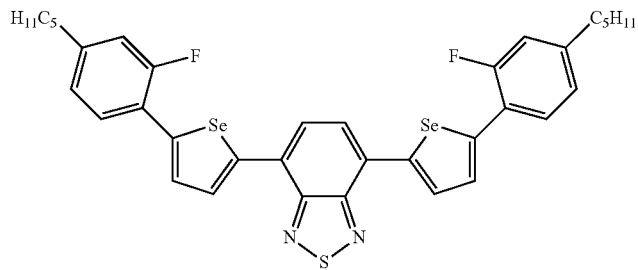
26
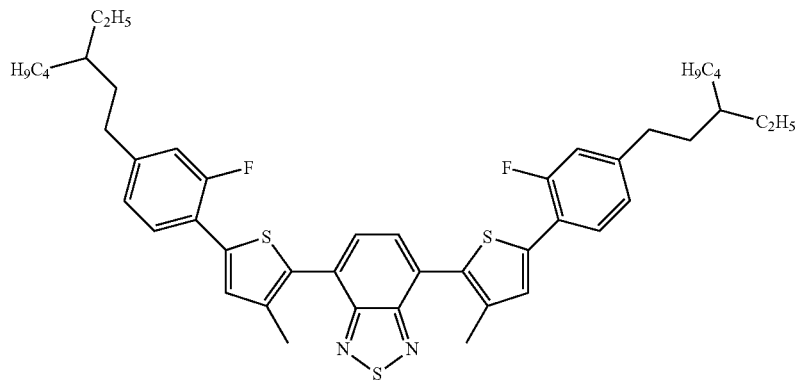
27
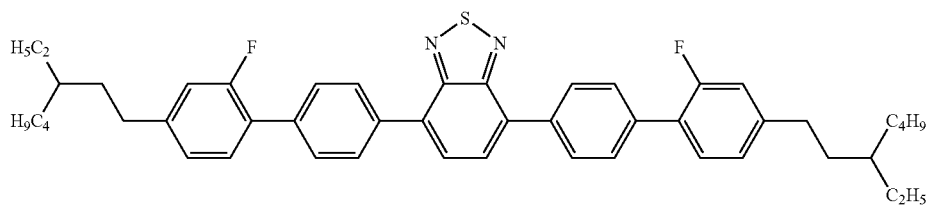
28

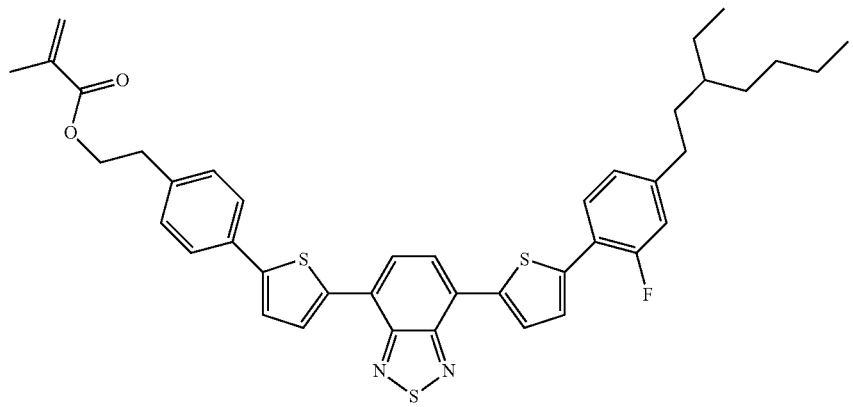
29
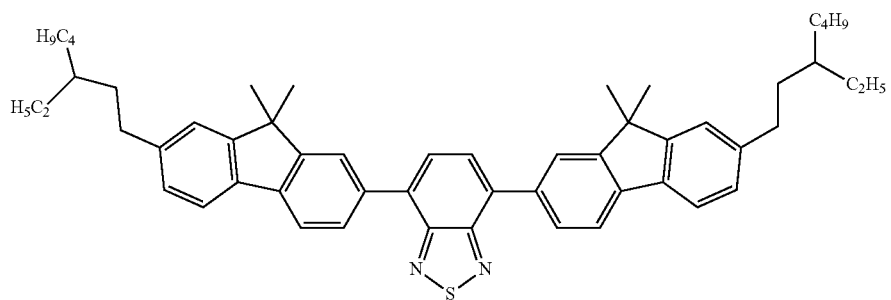
30
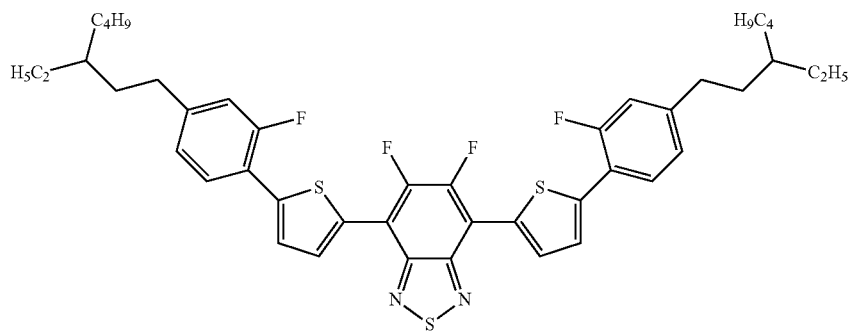
31
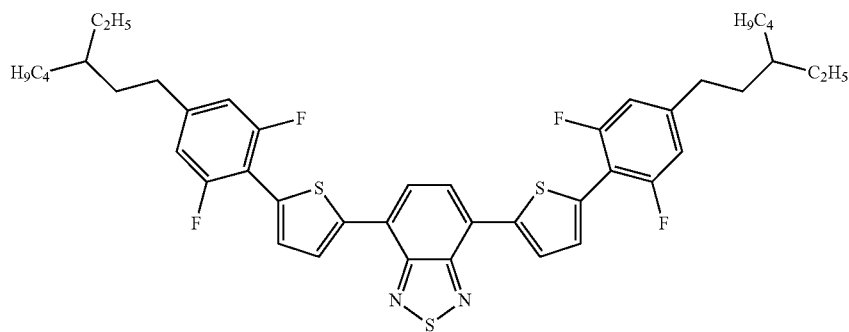
32

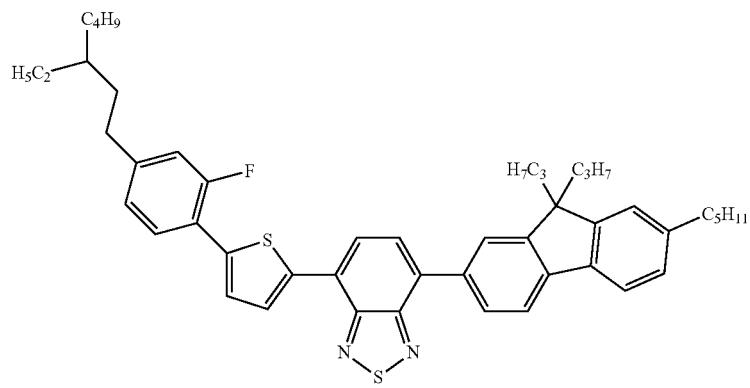
33
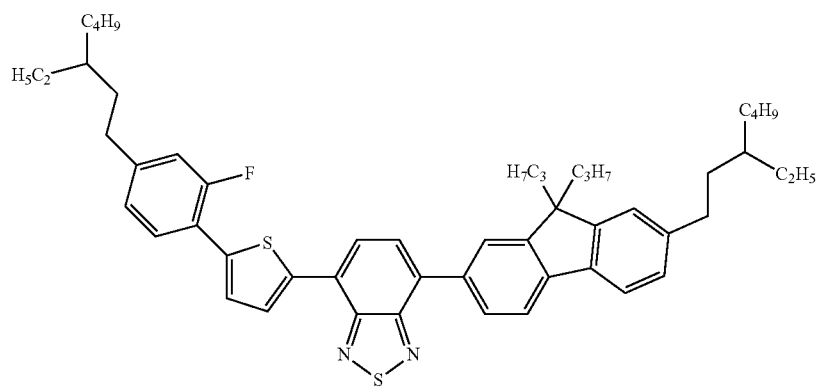
34
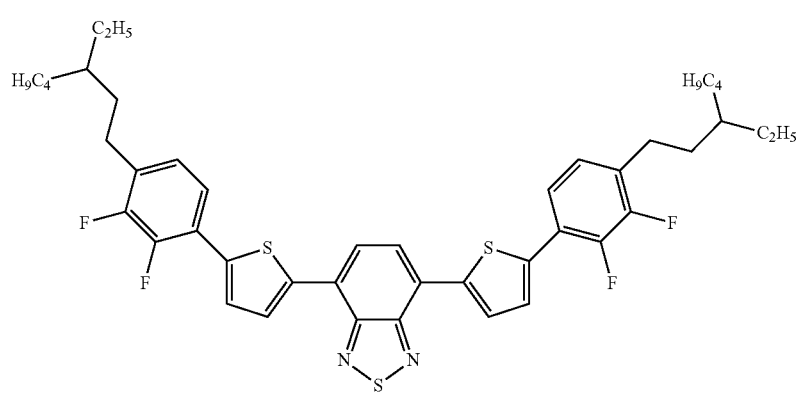
35
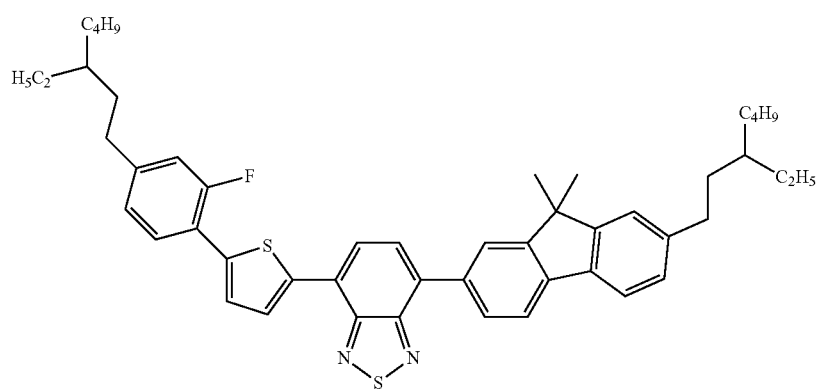
36

-continued
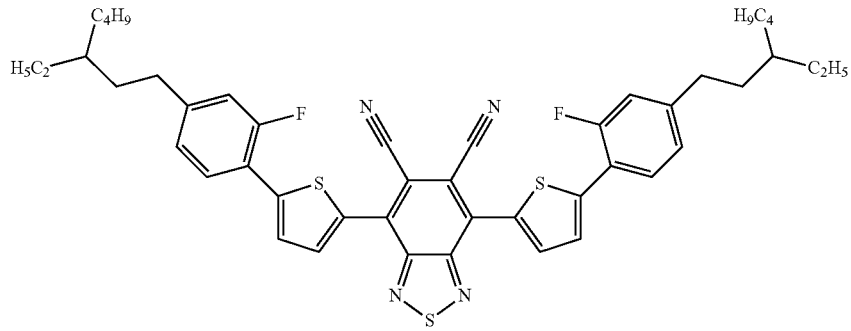
37
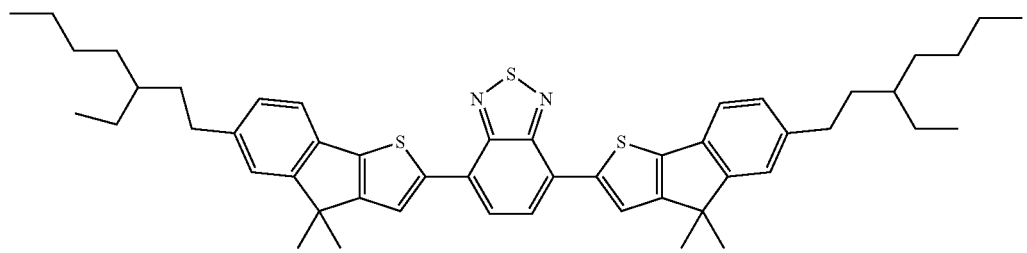
38
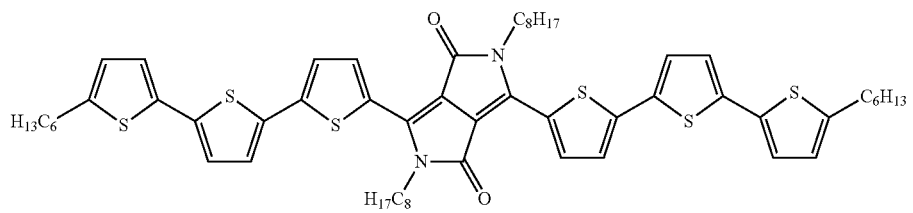
39
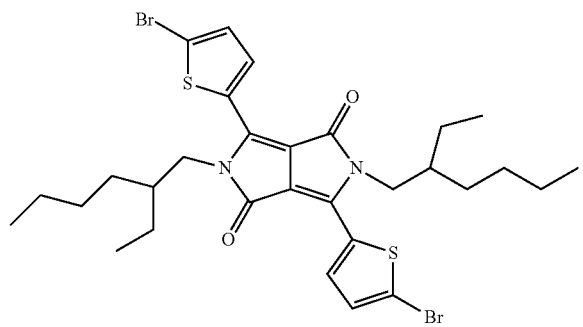
40
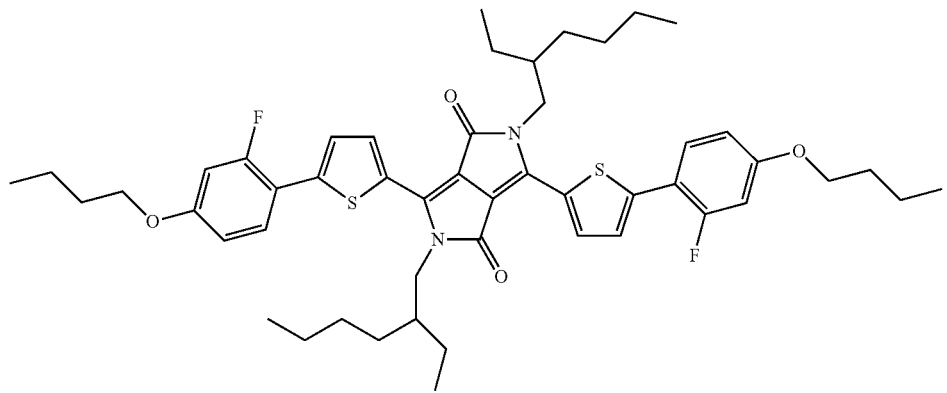
41

42
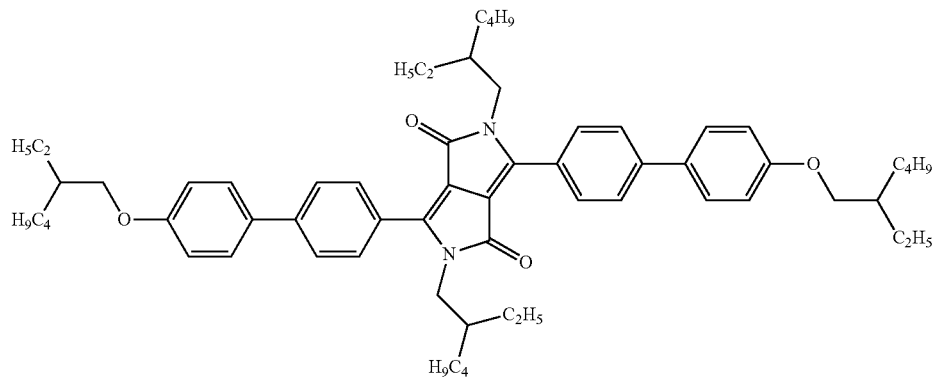
43
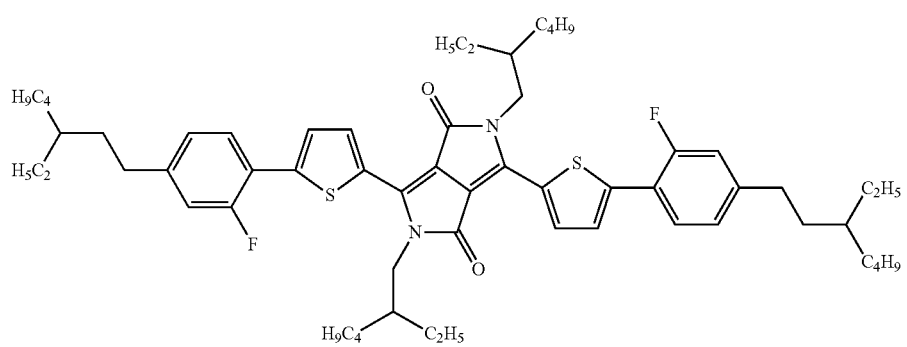
44
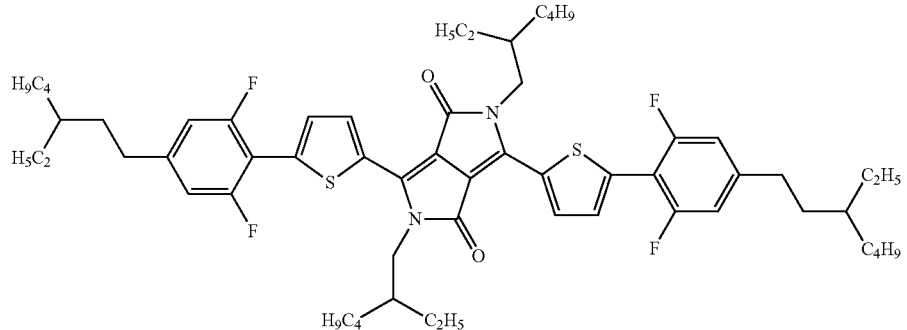
45
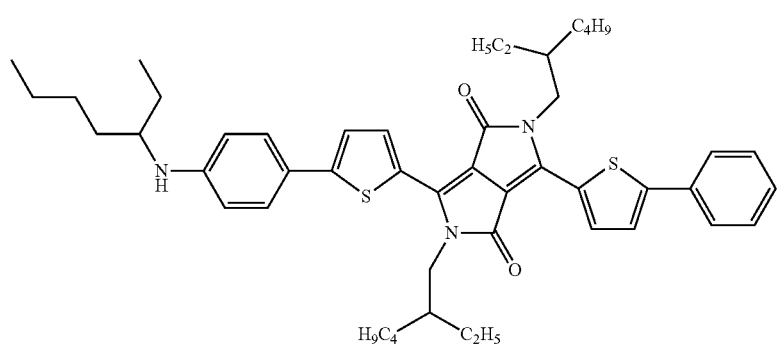

-continued
| | |
|---|---|
| 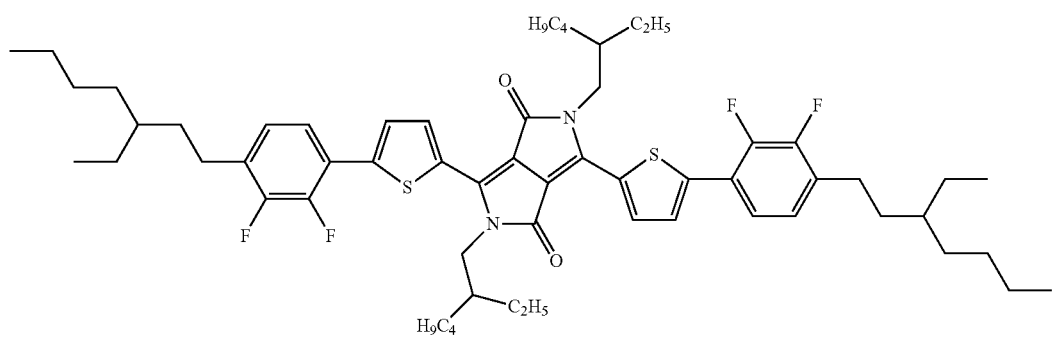 | 46 |
| 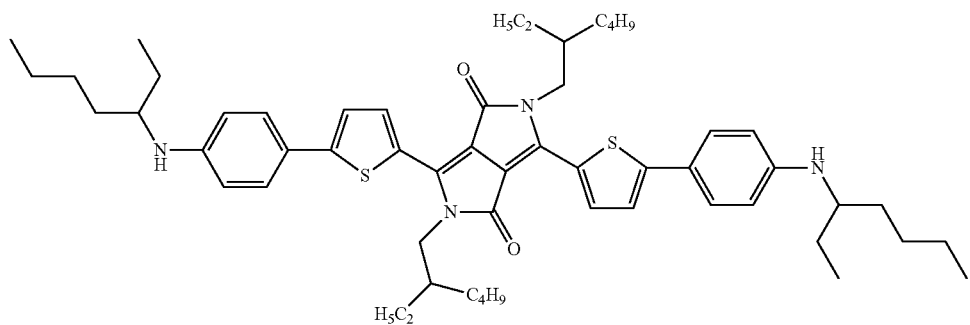 | 47 |
| 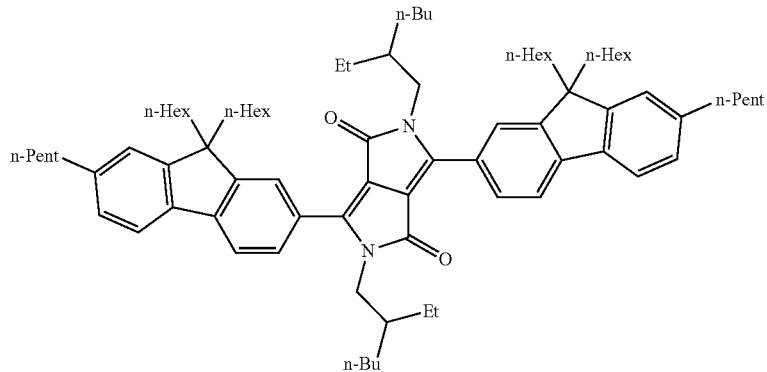 | 48 |
| 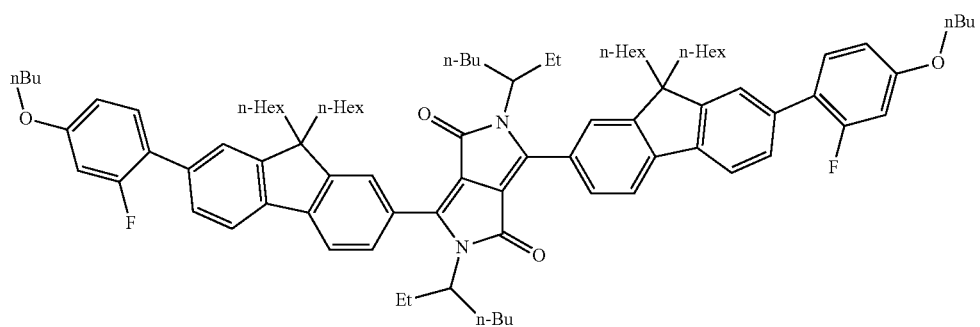 | 49 |

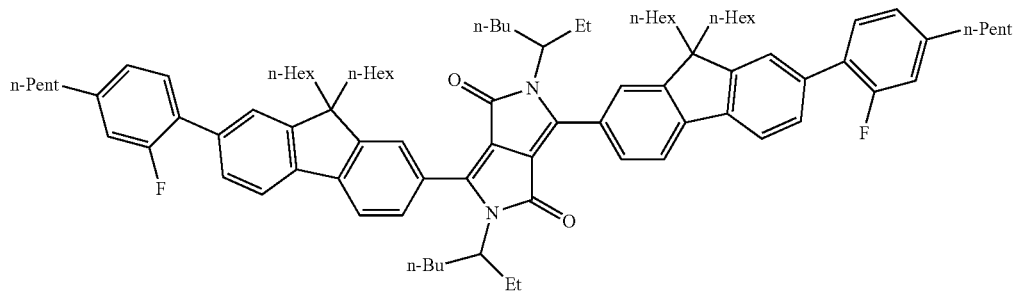
50
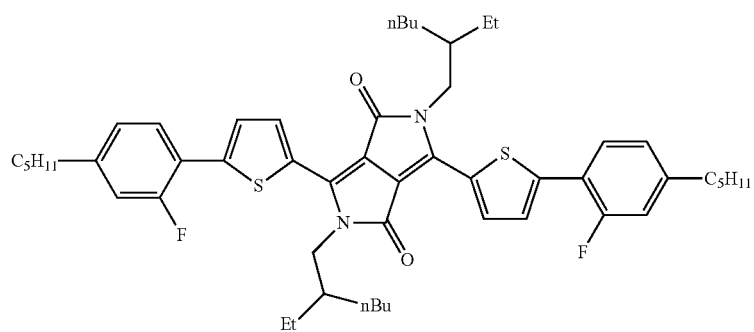
51
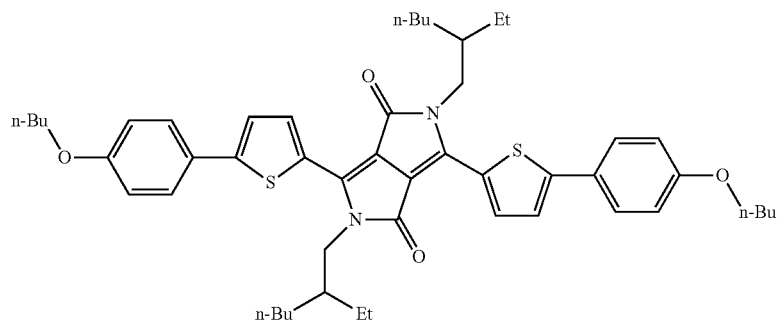
52
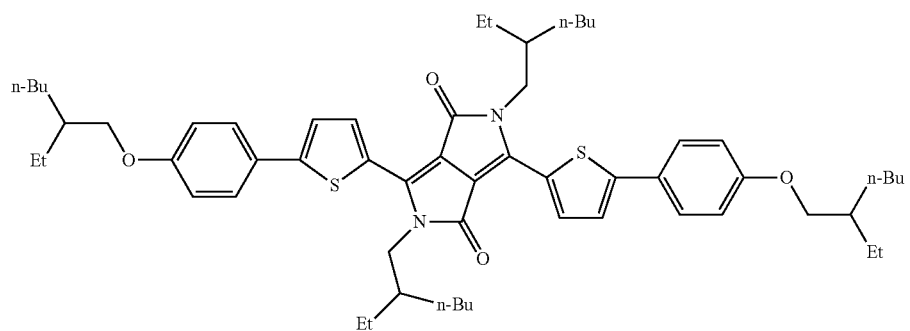
53

54
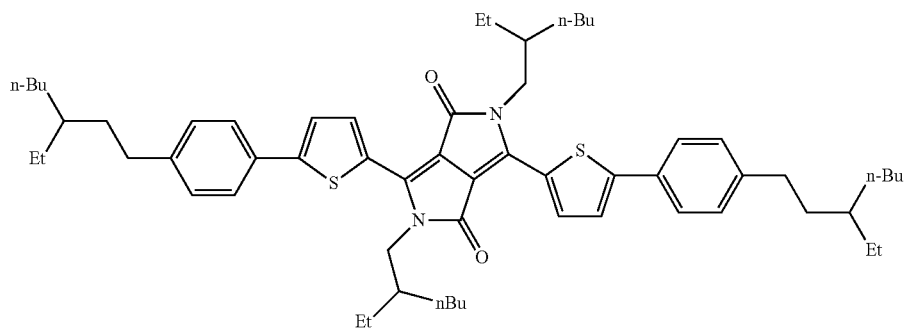
55
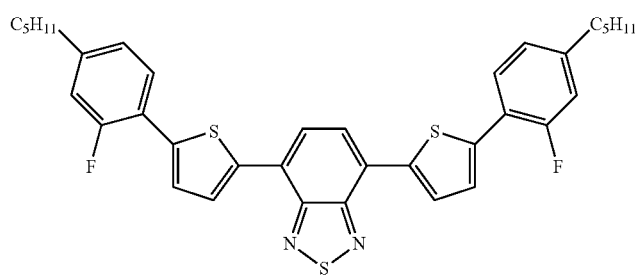
56
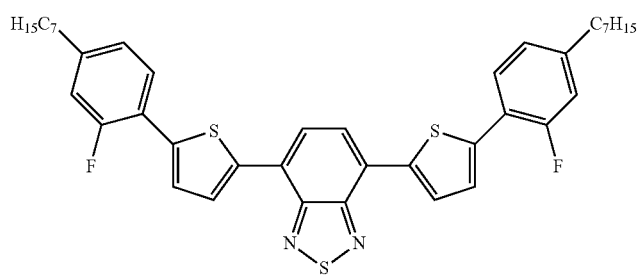
57
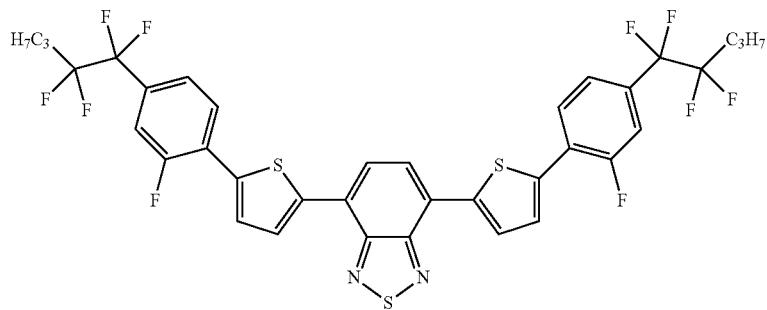
58
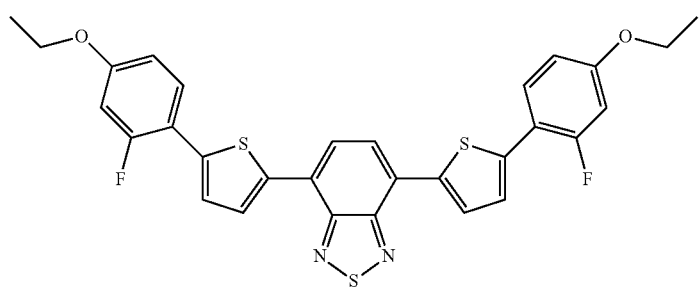

-continued
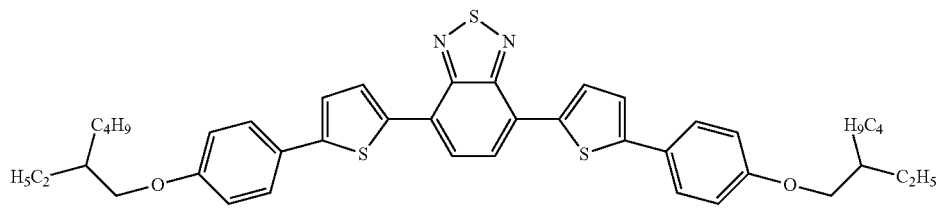
59
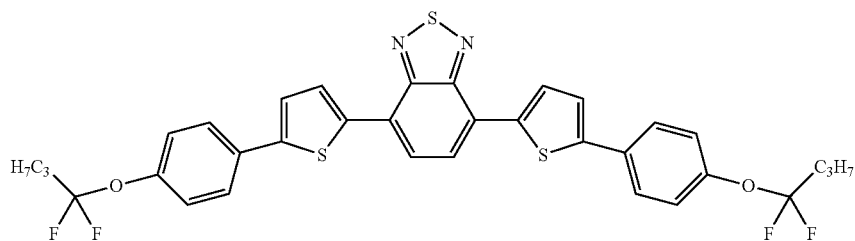
60
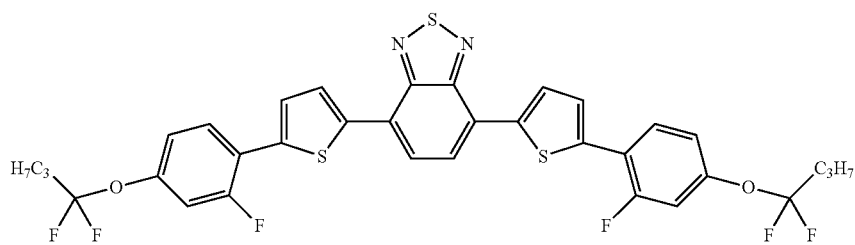
61
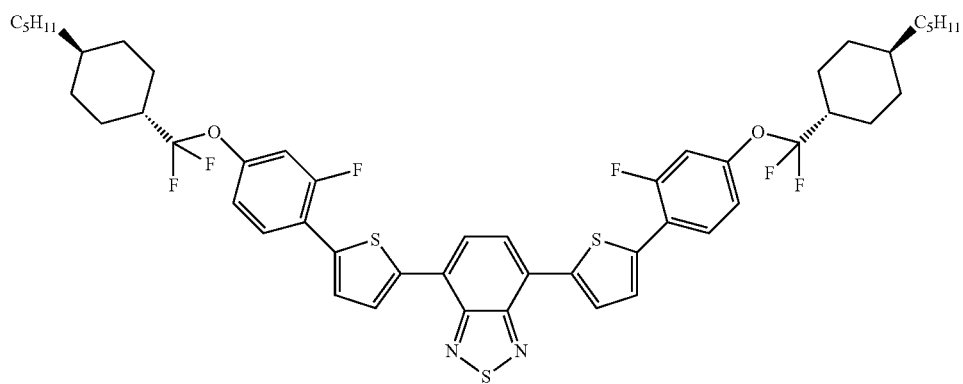
62
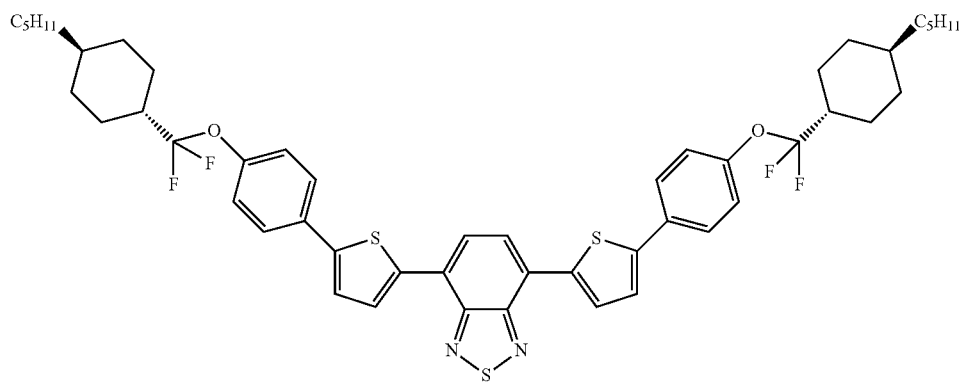
63

64
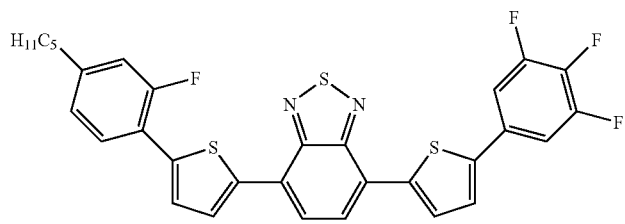
65
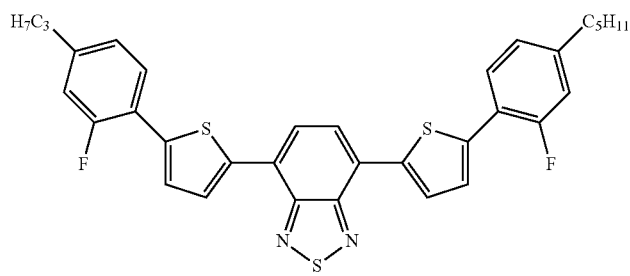
66
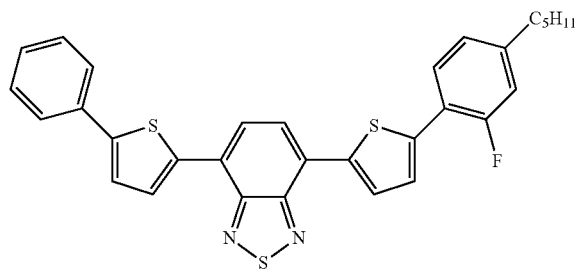
67
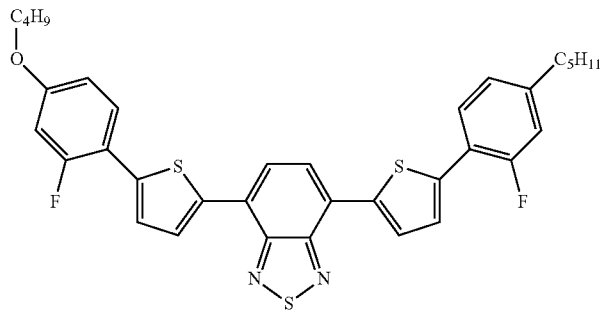
68
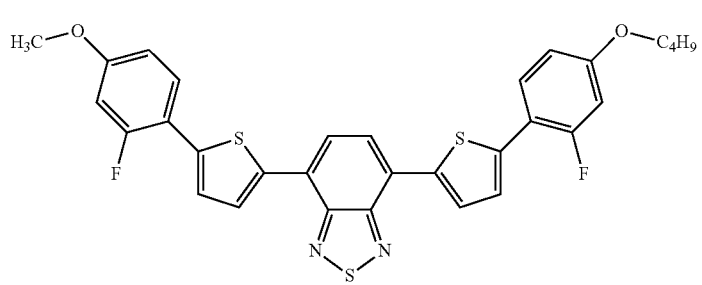

69
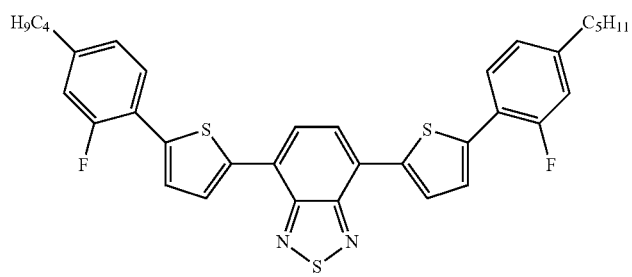
70
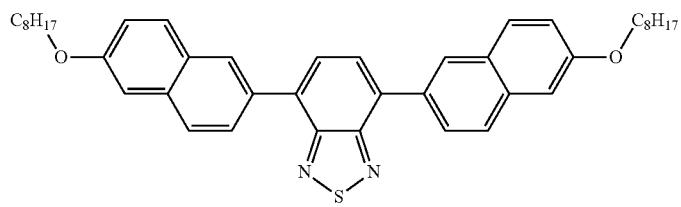
71
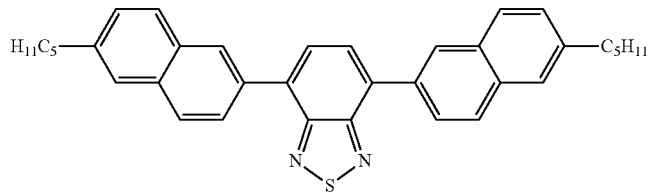
72
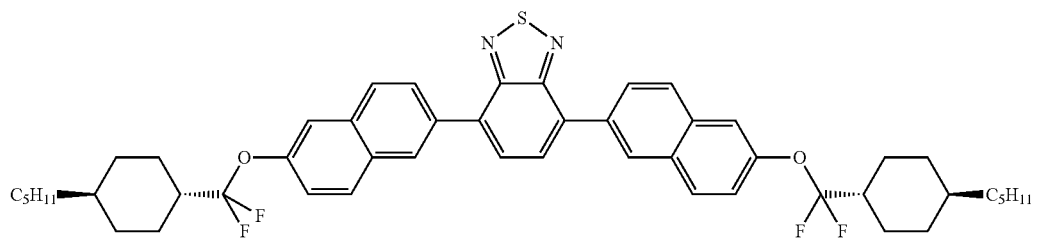
73
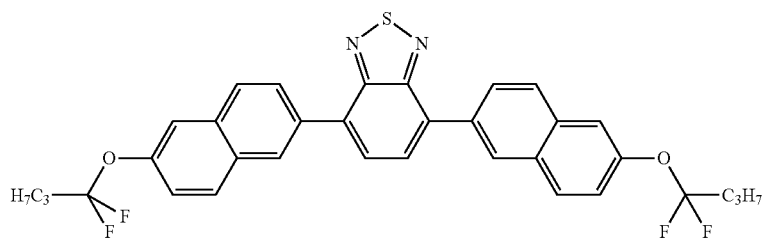
74
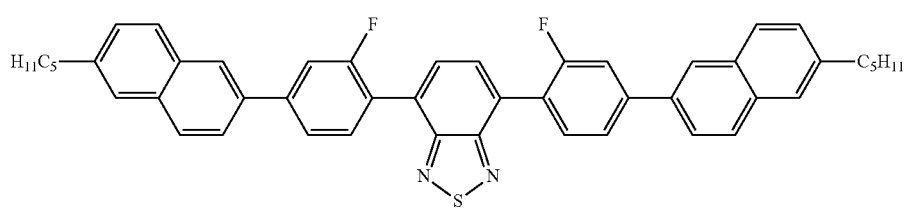
75
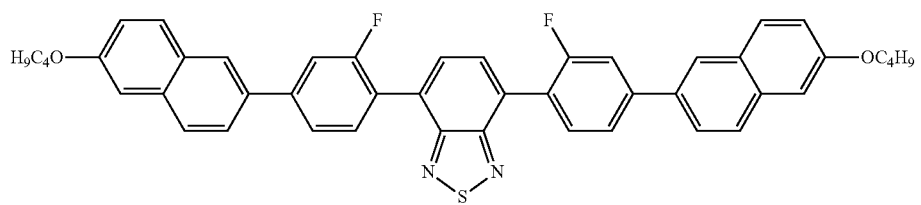

76
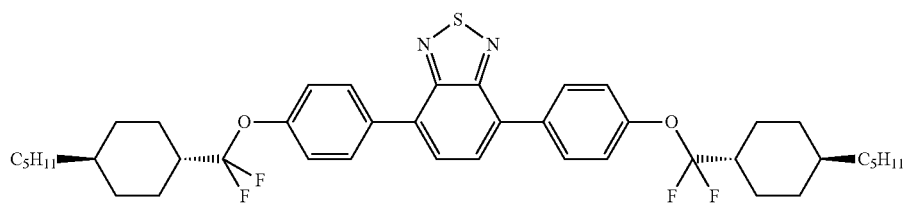
77
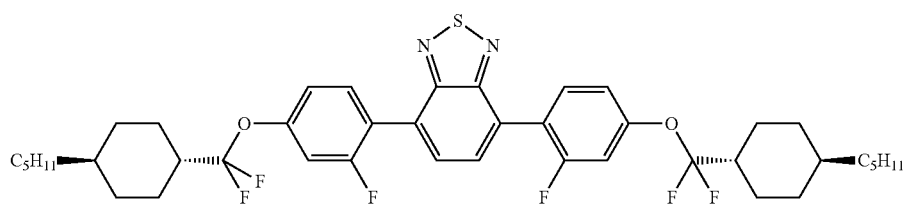
78
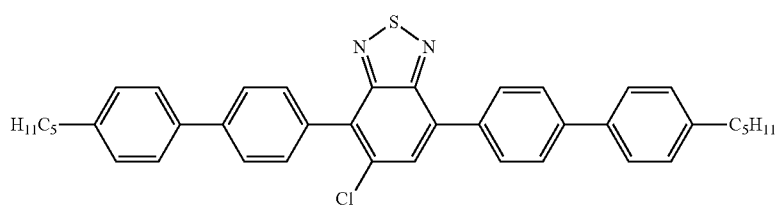
79
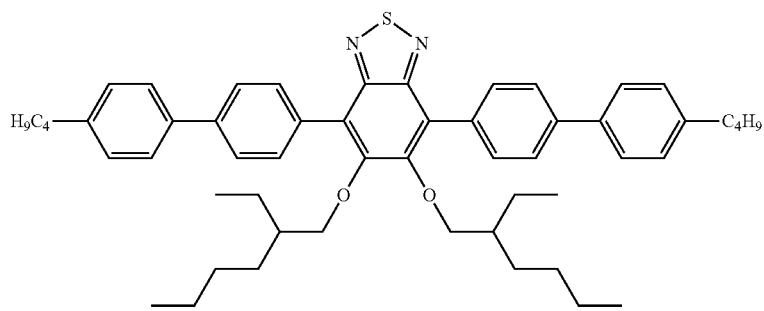
80
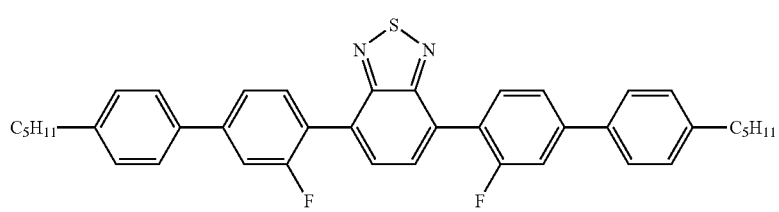
81
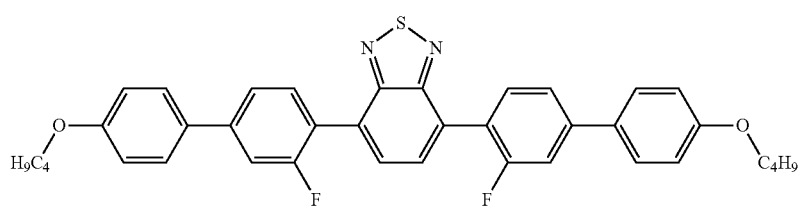
82
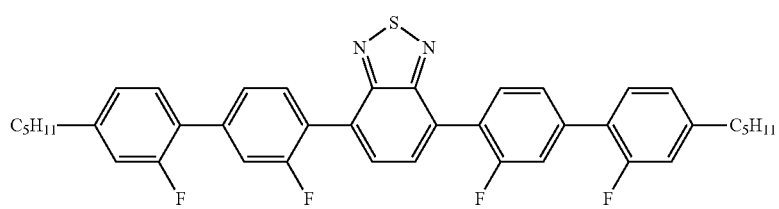

-continued
83
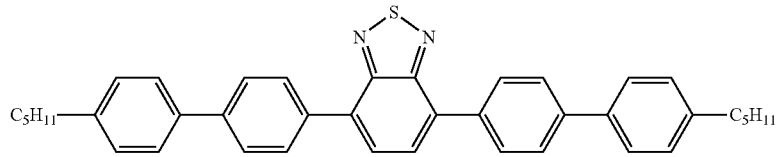
84
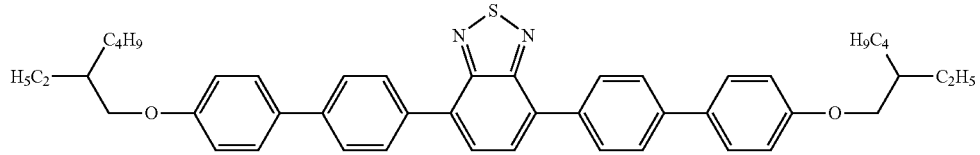
85
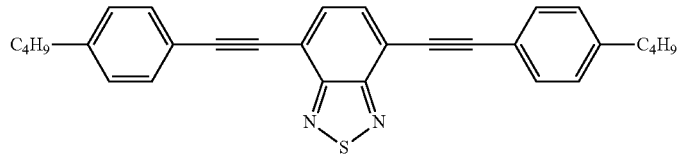
86
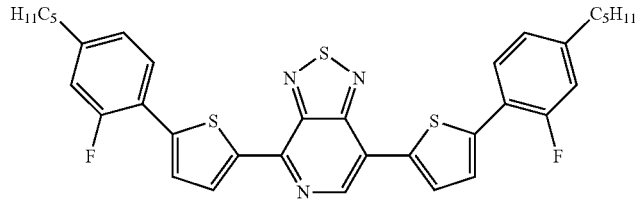
87
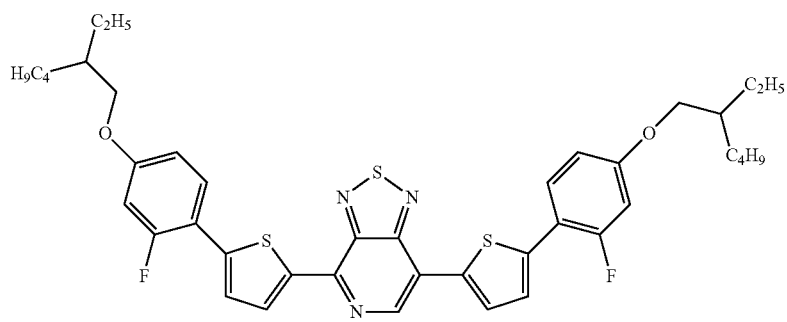
88
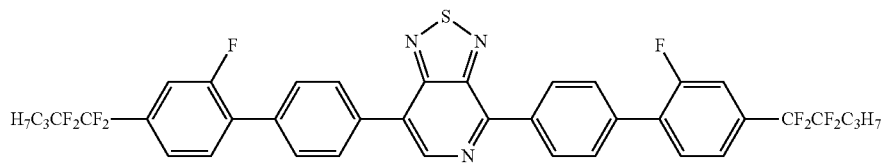
89
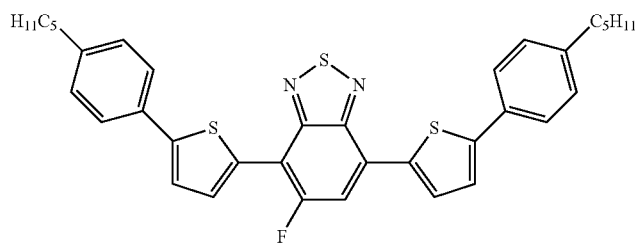

-continued
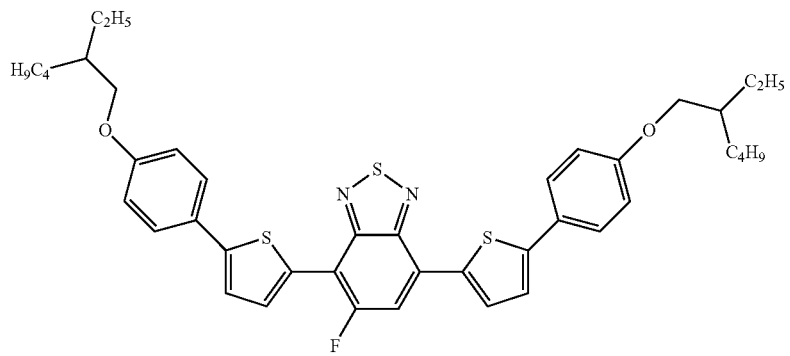
90
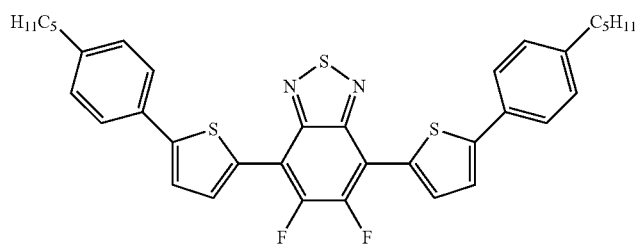
91
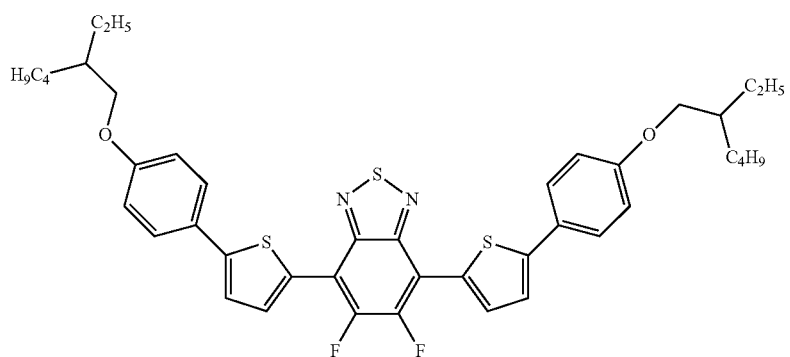
92
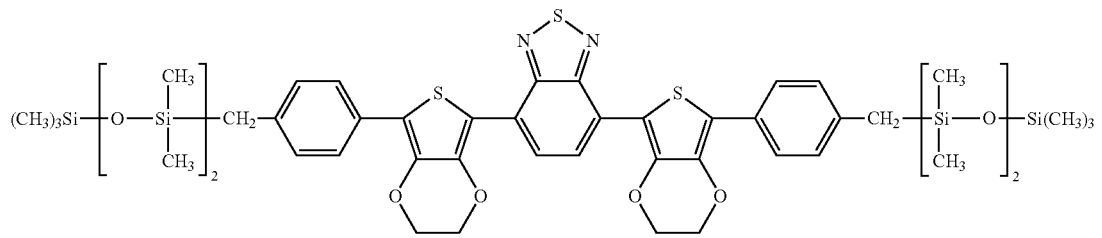
93
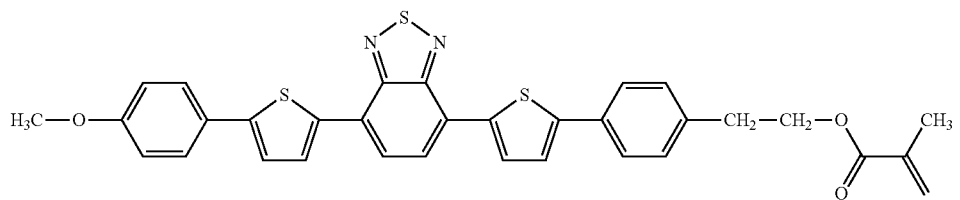
94
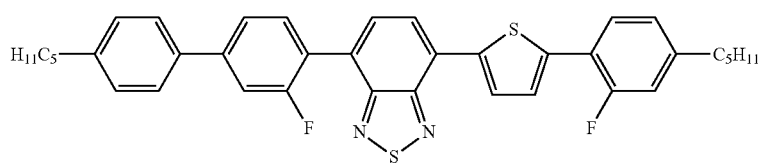
95

-continued
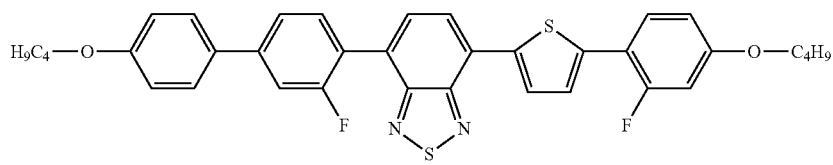
96
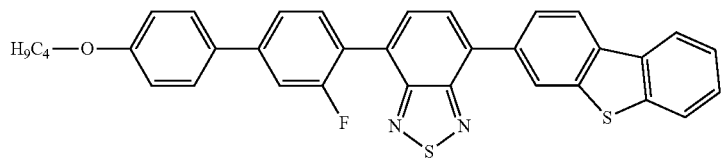
97
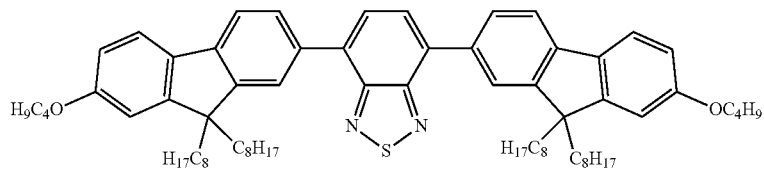
98
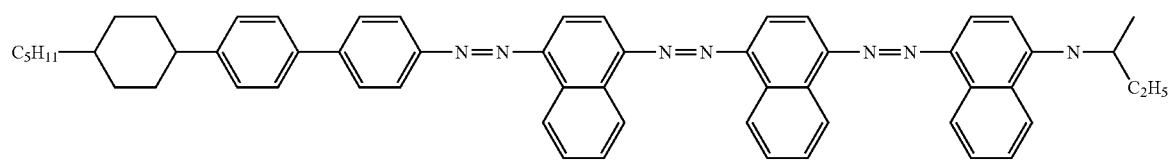
99
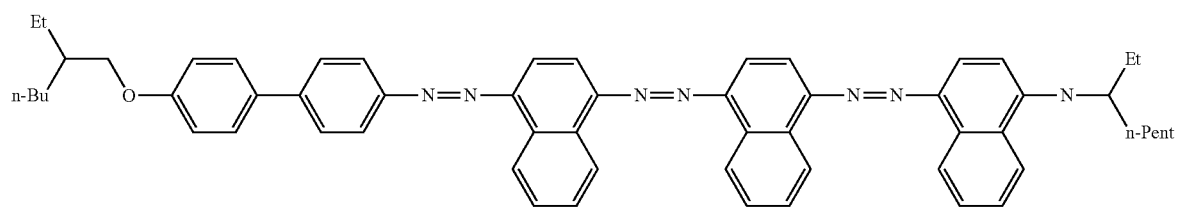
100
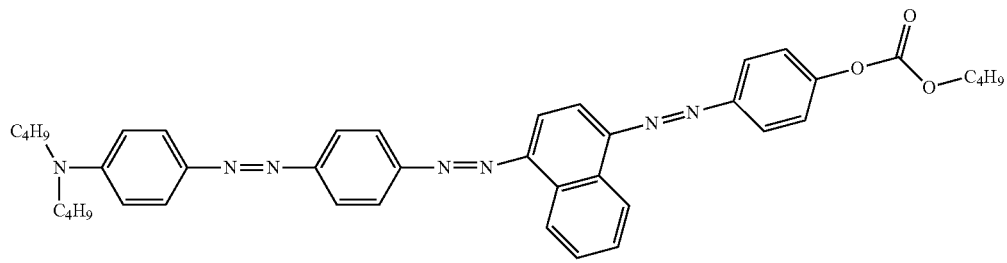
101
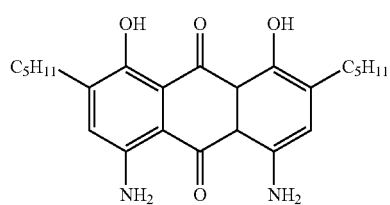
102
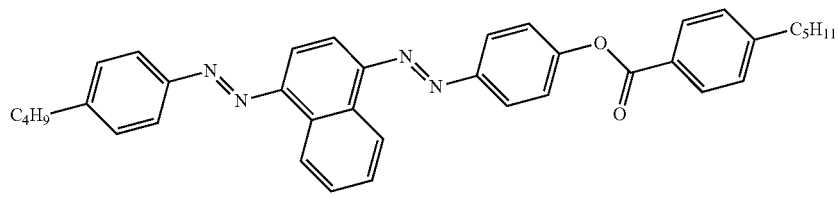
103

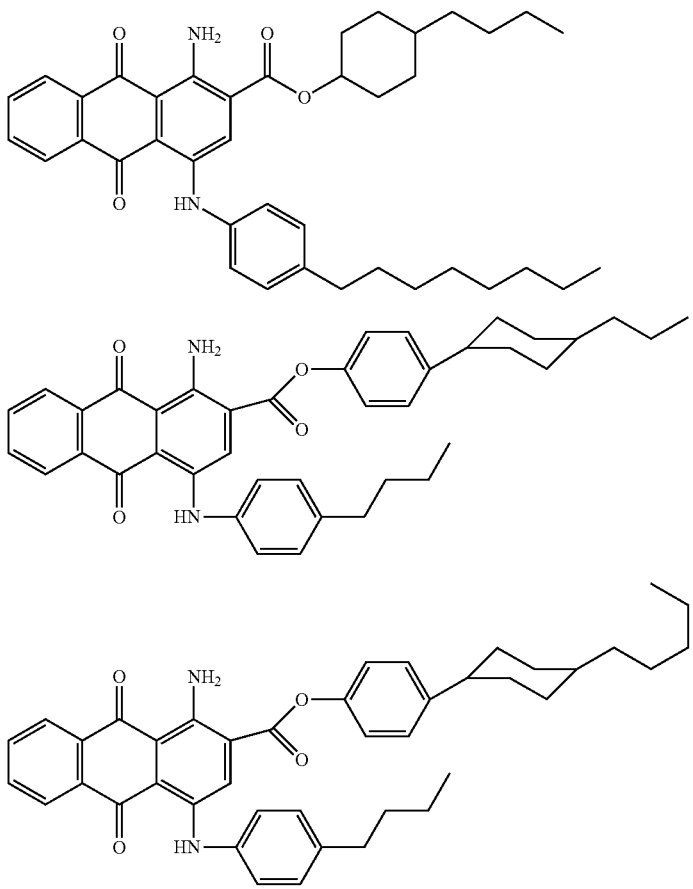

104

105

106

The liquid-crystalline material of the switching layer is preferably nematically liquid-crystalline at the operating temperature of the device. It is particularly preferably nematically liquid-crystalline in a range of +−20° C., very particularly preferably in a range of +−30° C. above and below the operating temperature of the device. The liquid-crystalline material furthermore preferably has a clearing point, preferably a phase transition from a nematically liquid-crystalline state to an isotropic state, above 80° C., particularly preferably above 100° C., very particularly preferably above 120° C., and most preferably above 130° C.

The liquid-crystalline material furthermore preferably comprises 3 to 30 different compounds, preferably 6 to 20, particularly preferably 8 to 18 different compounds.

The liquid-crystalline material furthermore preferably has an optical anisotropy (Δn) of 0.01 to 0.3, particularly preferably 0.04 to 0.27. The liquid-crystalline material likewise preferably has a dielectric anisotropy Δ∈ of 2 to 70 or −1.5 to −10.

Compounds which can be used as constituents of the liquid-crystalline material are known to the person skilled in the art and can basically be selected as desired. It is preferred that the liquid-crystalline material comprises at least one compound which contains structural elements based on 1,4-phenylenes and 1,4-cyclohexylenes. The liquid-crystalline material particularly preferably comprises at least one compound which contains 2, 3 or 4, particularly preferably 3 or 4 structural elements based on 1,4-phenylenes and 1,4-cyclohexylenes. The liquid-crystalline material furthermore preferably comprises a compound of a formula (I)

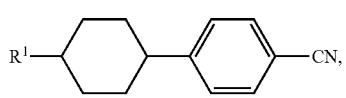

formula (I)

where $R^1$ is selected from alkyl groups having 1 to 10 C atoms.

The device preferably comprises one or more substrate layers, particularly preferably precisely two substrate layers, between which the switching layer is arranged. The substrate layers are preferably formed from glass or polymer, particularly preferably from polymer. Preference is given to polymers having low birefringence, in particular in the substrate layer which is adjacent to the polariser. Preferred polymer materials for the substrate layer are PMMA, polycarbonate, PET, PEN, COP or PVB. The use of substrate layers comprising polymer material has the advantage that curved substrate layers can be produced without major effort and have less stress birefringence than correspondingly curved glass layers. Furthermore, substrate layers comprising polymer material can be provided with very efficient UV filters, which protect the liquid-crystalline material and the dichroic dye against UV light and decomposition caused thereby.

The substrate layers of the device according to the invention preferably comprise polymer, particularly preferably comprise optically isotropic polymer. Substrate layers which are adjacent to the polariser in the device particularly preferably comprise polymer, particularly preferably comprise optically isotropic polymer. The said substrate layers preferably have no or only low stress birefringence. This can be achieved, in particular, by means of substrate layers comprising polymer. Optically isotropic materials which can be used as substrate layers are known to the person skilled in the art. Preference is given to the use of optically isotropic polymers which have no or only low retardation as optically isotropic substrate layers in the device according to the invention. Optically isotropic in connection with substrate layers of the device means the substantial, preferably complete absence of birefringence, where stress birefringence is encompassed by the term birefringence.

It is preferred that one or more further layers are located between the polarisation layer and the next substrate layer from the point of view of the switching layer. These layers preferably compensate for the different coefficients of thermal expansion of polarisation layer and substrate layer. Layers selected from adhesive layers and adhesive films, for example Optically Clear Adhesive from 3M or PVB (polyvinylbutyral), or EVA (ethylene vinyl acetate), are preferred for this purpose.

The optical switching device can be used in display devices (displays) or in switchable windows. A switchable window is taken to mean a device for the homogeneous regulation of the passage of light through an area element, in particular for the regulation of the passage of sunlight. The said device is preferably employed in a switchable window. Homogeneous regulation here is taken to mean that the transmission is substantially the same at all points within the area element.

The area element here preferably has a dimension of at least 0.05 m$^2$, particularly preferably at least 0.1 m$^2$, especially preferably at least 0.2 m$^2$. On use in windows of buildings, even larger area elements are preferred, at least 0.5 m$^2$, particularly preferably at least 0.8 m$^2$.

The device for the regulation of the passage of light through an area element preferably comprises the mixture in the form of a layer. This layer is preferably switchable, i.e., represents a switching layer. The layer preferably has a thickness of 12 to 40 µm, particularly preferably of 14 to 30 µm and very particularly preferably of 15 to 25 µm.

The device according to the invention is preferably suitable for the regulation of the passage of light in the form of sunlight from the environment into a space. The space here can be any desired space that is substantially sealed off from the environment, for example a building, a vehicle or a container. The device can generally be used for any desired spaces, particularly if these have only limited exchange of air with the environment and have light-transmitting boundary surfaces through which the entry of energy from the outside in the form of light energy can take place. The device is particularly preferably used for spaces which are subjected to strong insulation through light-transmitting areas, for example through window areas. Examples thereof are spaces having large window areas to the outside and the interiors of vehicles, for example of motor vehicles, ships or aircraft, in particular of automobiles. In the case of the use in automobiles, the use in the roof area, in particular in sliding roofs and panorama roofs, is preferred.

The device according to the invention is preferably arranged in an opening of a relatively large two-dimensional structure, where the two-dimensional structure itself only allows little passage of light or none at all, and where the opening transmits light to a greater extent in relative terms. The two-dimensional structure is preferably a wall or another delimitation of a space from the outside.

The device according to the invention preferably contains an optical waveguide system which transports light to a solar cell or another device for the conversion of light and/or heat energy into electrical energy, preferably as described in WO 2009/141295.

The device is preferably used in windows in buildings. In this case, the device according to the invention is a component of a window which can be switched in its light transmission, particularly preferably a window containing at least one glass area, very particularly preferably a window which contains multipane insulating glass. Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass area of a window, particularly preferably in the interspace between two glass panes of multipane insulating glass.

The device is furthermore preferably used as active, switching component of partially light-transparent, switchable automobile roofs or of switchable automobile windows.

The layer sequence here is preferably polarisation layer
substrate layer, preferably comprising glass or polymer
electrically conductive transparent layer, preferably comprising ITO
alignment layer
switching layer comprising a liquid-crystalline material and at least one dichroic dye
alignment layer
electrically conductive transparent layer, preferably comprising ITO
substrate layer, preferably comprising glass or polymer.

where the polarisation layer faces outwards, towards the light source, in particular towards the sun.

Alternatively, the polarisation layer may also be located between the two substrate layers or on the side of the device facing away from the sun. In this case, it is preferred that the layers lying on the outside of the switching layer absorb UV light. In particular, it is preferred that the substrate layer comprises UV-absorbent additives, or that a UV filter has been applied to the substrate layer.

It is furthermore preferred, in particular in the case of the use of the device in switchable automobile roofs, that the device is not flat, but instead is curved in space. This is preferably achieved by the use of curved substrate layers. Polymer substrate layers which are optically isotropic are preferably used here. This enables devices to be obtained which are two- or three-dimensionally curved, and which have uniform transmission, also no interfering colour variations.

WORKING EXAMPLES

1) Materials Used for the Switching Layer

Structures of liquid-crystalline compounds are reproduced by means of abbreviations (acronyms). For the abbreviations used, reference is made to the explanations in WO 2012/052100, pp. 63-89.

All physical properties are determined in accordance with "Merck Liquid Crystals, Physical Properties of Liquid Crystals", Status November 1997, Merck KGaA, Germany, and apply for a temperature of 20° C.

The following host mixture is prepared:

| Composition of host mixture H1 | |
| --- | --- |
| Clearing point | 114.5° C. |
| Delta-n | 0.1342 |

| Composition of host mixture H1 | | |
|---|---|---|
| $n_e$ | 1.6293 | |
| $n_o$ | 1.4951 | |
| Compound | | |
| Composition | CPG-3-F | 5 |
| | CPG-5-F | 5 |
| | CPU-3-F | 15 |
| | CPU-5-F | 15 |
| | CP-3-N | 16 |
| Composition of host mixture H1 | |
|---|---|
| CP-5-N | 16 |
| CCGU-3-F | 7 |
| CGPC-3-3 | 4 |
| CGPC-5-3 | 4 |
| CGPC-5-5 | 4 |
| CCZPC-3-3 | 3 |
| CCZPC-3-4 | 3 |
| CCZPC-3-5 | 3 |
The following dye compounds are used:
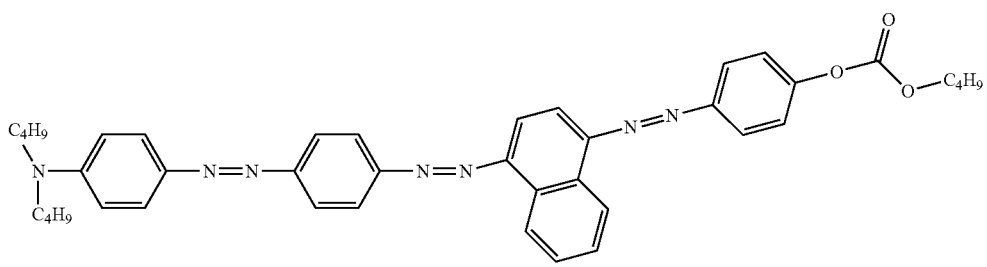
D1
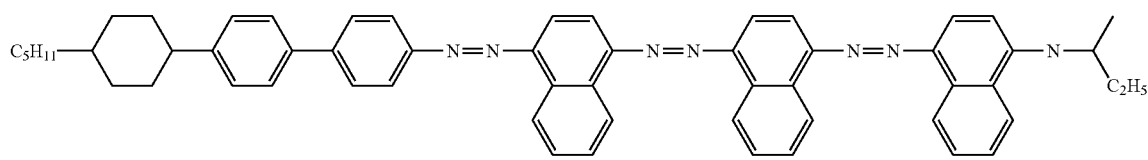
D2
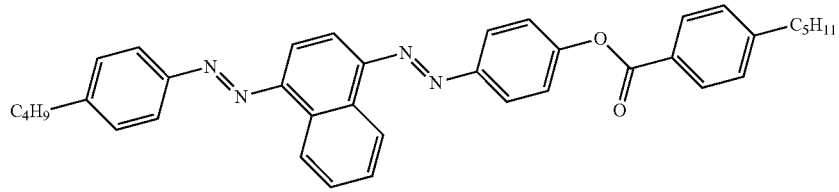
D3
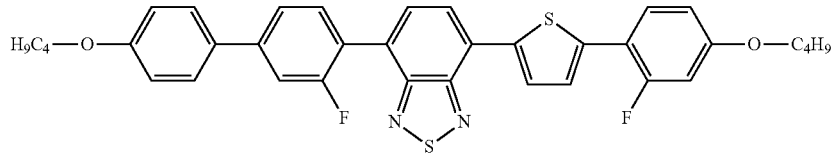
D4
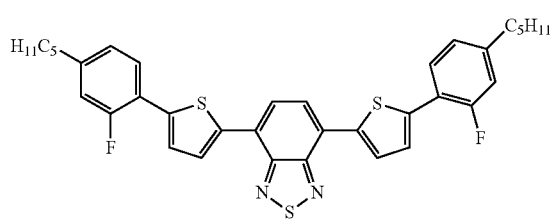
D5
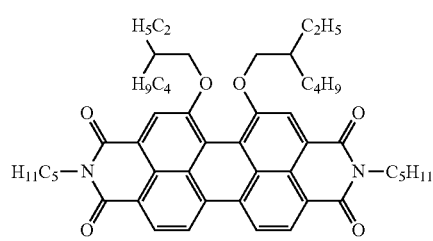
D6

-continued

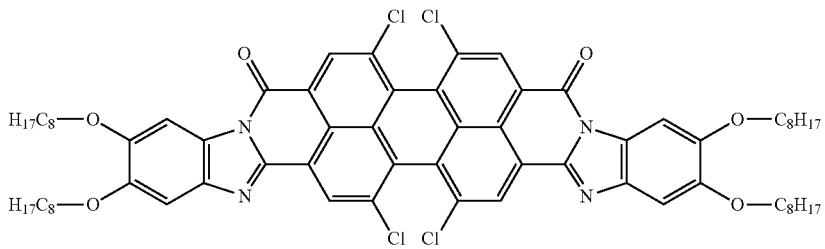

D7

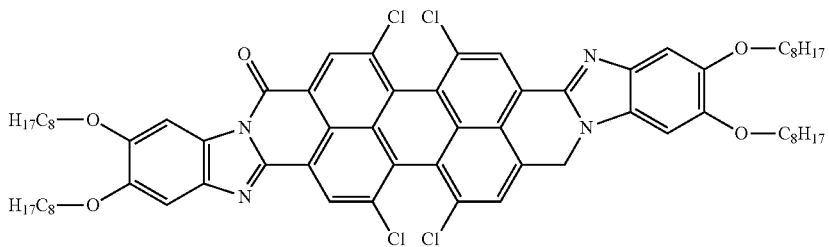

D8

These are used to prepare mixtures M1 and M2, having the following composition:

M1: H1 host mixture further comprising 0.47% by weight of D1, 1.03% by weight of D2 and 0.892% by weight of D3.

M2: H1 host mixture further comprising 0.6% by weight of D4; 0.3% by weight of D5; 1.0% by weight of D6; 1.5% by weight of D7 and 1.5% by weight of D8.

2) Production of the Switching Devices

The devices according to the invention have the following general layer sequence:

a0) ITOS XP40HT polariser film
a) polymer layer comprising 125 μm of polycarbonate with retardation less than 10 nm
b) indium zinc oxide (ITO) layer, 200 çngström
c) polyimide AL-1054 alignment layer from JSR, 300 çngström
d) switching layer, thickness 10 μm
e) as c)
f) as b)
g) as a).

The alignment layers are rubbed in order to achieve a preferential direction of the molecules of the liquid-crystalline material. If a twist of 90° is to be achieved, the two alignment layers are arranged crossed to one another in the device, i.e., in such a way that the rubbing directions enclose an angle of 90° to one another. In addition, 0.05% by weight of the chiral dopant S-811 is, in this case of the layer having a twist, present in the liquid-crystalline material. The ITO layers (other electrically conductive transparent layers known to the person skilled in the art can alternatively be used) are provided with corresponding contacts in order to be electrically switchable. The state without voltage is the dark state in the case of the switching devices produced. By application of a voltage which sets the molecules of the liquid-crystalline material in the upright position relative to the plane of the alignment layers, the devices are switched into the bright switching state.

The following switching devices are produced:

E1: switching layer comprising mixture M1, 90° twist
E2: switching layer comprising mixture M1, 0° twist
E3: switching layer comprising mixture M2, 0° twist 3) Performance Data of the Switching Devices a) Determination of the Light Transmittance $\tau_{v\ dark}$ of the Switching Layer The light transmittance $\tau_{v\ dark}$ is determined in accordance with European standard EN410, equation (1) (Determination of luminous and solar characteristics of glazing) from the measured spectral transmittances taking into account the relative spectral distribution of the standard illuminant and the spectral brightness sensitivity of the standard observer. The transmittance $\tau_v$ of the switching layer of the devices for light which is polarised parallel to the principal axis of absorption of the dichroic dye in the dark switching state of the device is measured.

For measurement of the properties of the switching layer, the spectrometer is fitted with two Glan Thompson quartz polarisers in the reference and measurement beams. The device to be measured is mounted with its surface precisely perpendicular to the light beam. The alignment direction of the first device substrate facing the light beam is selected, for example, so that it points from down to up, i.e., vertically to the laboratory space. Since positively dichroic dyes align precisely along this direction, the principal axis of the most intense absorption for the untwisted examples E2 and E3 is precisely parallel to this direction. (For the twisted example E1, the first layer is likewise precisely parallel to this direction and the final layer is precisely perpendicular to this direction).

The two Glan Thompson polarisers are aligned in such a way that the transmission correspondingly reaches the lowest possible value precisely at this angular position.

The measurement of the spectral transmittance is compared with an otherwise identical device without dye in the switching layer as reference, i.e., the $\tau_{v\ dark}$ in % value in the table below corresponds to the quotient of the light intensities through the switching layer with dye(s) (numerator) and the light intensities through the switching layer without dye(s) (denominator).

| Device | Temperature in ° C. | Light transmittance $T_{v\ dark}$ in % switching layer |
|---|---|---|
| E1 | 20 | 1.8 |
|  | 60 | 2.6 |

-continued

| Device | Temperature in ° C. | Light transmittance $T_{v\ dark}$ in % switching layer |
|---|---|---|
|  | 80 | 2.8 |
|  | 120 | 13.8 |
| E2 | 20 | 1.3 |
|  | 60 | 1.8 |
|  | 80 | 2.0 |
|  | 100 | 2.6 |
|  | 120 | 11.3 |
| E3 | 20 | 1.8 |
|  | 40 | 2.0 |
|  | 60 | 2.3 |
|  | 80 | 2.6 |
|  | 100 | 3.6 |
|  | 120 | 17.6 | b) Determination of the Light Transmittance $\tau_{v\ dark}$ of the Complete Device with Polariser To this end, the procedure as under a) is followed, with the difference that, in order to calculate the light transmittance, the intensities after passage of light through the complete device with polariser are determined (numerator), and these are compared with the intensities through a device which is complete with switching layer but without polariser and without dyes, i.e., the $\tau_{v\ dark}$ in % value in the table below corresponds to the quotient of the light intensities through the switching layer with polariser and dye(s) (numerator) and the light intensities through the switching layer without polariser and dye(s) (denominator). The $\tau_{v\ bright}$ in % values are also measured through the whole device and they are determined in the bright switching state, where the liquid-crystalline material comprising the dye(s) has a homeotropic alignment.

| Device | Temperature in ° C. | Light transmittance $T_{v\ dark}$ in % | Light transmittance $T_{v\ bright}$ in % |
|---|---|---|---|
| E1 | 20 | 0.7 | 23.9 |
|  | 60 | 1.0 | 23.9 |
|  | 80 | 1.1 | 22.2 |
|  | 120 | 5.4 | 9.1 |
| E2 | 20 | 0.5 | 25.5 |
|  | 60 | 0.7 | 23.4 |
|  | 80 | 0.8 | 21.8 |
|  | 100 | 1.0 | 19.0 |
|  | 120 | 4.4 | 10.1 |
| E3 | 20 | 0.7 | 24.5 |
|  | 40 | 0.8 | 23.4 |
|  | 60 | 0.9 | 21.8 |
|  | 80 | 1.0 | 19.6 |
|  | 100 | 1.4 | 16.2 |
|  | 120 | 6.9 | 6.9 |

The results show that excellent darkening is achieved with the devices according to the invention in the dark switching state of the device ($\tau_{v\ dark}$=0.5%-0.7%). In addition, the very dark switching state is achieved over a broad temperature range. Even at a temperature above the clearing point of the host mixture, low values for $\tau_{v\ dark}$ in the single-FIGURE percentage range are still obtained.

c) Determination of the Angle Dependence of the Transmission

The transmission as a function of wavelength is determined for devices E1 to E3 in each case for various value pairs of polar angle θ and azimuth angle φ. It is found here that the spectral transmission is substantially independent of the angle at which light passes through the device. This relates to a broad wavelength range. The devices therefore do not have an undesired colour for the observer if they are observed from different viewing angles. A further advantage is that the devices block light effectively for a broad range of passage angles if they are switched into the dark switching state.

The maximum transmission changes for devices E1, E2 and E3 are indicated in the following tables:

| Device E1 | |
|---|---|
| | Value of the maximum change in transmission (Δ T %) for an angle θ = 60° from the perpendicular and the angles φ = 0, 45, 90, 135, 180, 225, 270, 315° within the plane relative to the value of the angle θ = 0°, φ = 0° |
| Wavelength | (=perpendicular) smaller than |
| 450 nm | 0.8% |
| 500 nm | 1.6% |
| 550 nm | 1.4% |
| 600 nm | 1.2% |
| 650 nm | 1.2% |
| 700 nm | 1.1% |

| Device E2 | |
|---|---|
| | Value of the maximum change in transmission (Δ T %) for an angle θ = 60° from the perpendicular and the angles φ = 0, 45, 90, 135, 180, 225, 270, 315° within the plane relative to the value of the angle θ = 0°, φ = 0° |
| Wavelength | (=perpendicular) smaller than |
| 450 nm | 1.5% |
| 500 nm | 1.2% |
| 550 nm | 1.0% |
| 600 nm | 1.2% |
| 650 nm | 1.4% |
| 700 nm | 2.2% |

| Device E3 | |
|---|---|
| | Value of the maximum change in transmission (Δ T %) for an angle θ = 60° from the perpendicular and the angles φ = 0, 45, 90, 135, 180, 225, 270, 315° within the plane relative to the value of the angle θ = 0°, φ = 0° |
| Wavelength | (=perpendicular) smaller than |
| 450 nm | 2.1% |
| 500 nm | 1.0% |
| 550 nm | 1.0% |
| 600 nm | 1.1% |
| 650 nm | 1.6% |
| 700 nm | 1.3% | d) Production of Three-Dimensionally Curved Devices

The devices obtained under 2) are converted into a curved shape by fixing them between two watch glasses having a large radius and pressing them against the latter so that they are in contact with the watch glasses and take on their curvature.

The devices are subsequently switched, and their transmission is measured. Uniform transmission over the area of the device is observed here, both in the dark switching state and also in the bright switching state. Furthermore, no colour changes which are visible to the eye are observed. This shows that curved devices which have uniform transmission and colour can be obtained with the devices comprising substrate layers comprising polymer.

4) Switching Devices Comprising Glass Substrate Layers

Devices are produced as indicated above under 2), which differ merely in that, instead of layers a) and b), they have the layers a') and b') indicated below:

a') glass layer comprising 1.1 mm of soda-lime glass from Corning b') ITO layer, 200 çngström The same values for the light transmittance $\tau_v$ as given above for the devices having a polymer substrate layer are obtained with these devices. The same values for the maximum transmission changes indicated above are also obtained.

However, devices having significantly less good curvature can be produced, since these unexpectedly break easily. Furthermore, curved devices of this type having glass substrate layers exhibit colour effects when viewed from angles which differ from the perpendicular.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European patent application No. EP 16175747.1, filed Jun. 22, 2016, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Optical switching device comprising the following layer sequence:
    polarisation layer;
    substrate layer;
    electrically conductive transparent layer;
    alignment layer;
    switching layer;
    alignment layer;
    electrically conductive transparent layer; and
    substrate layer
where the device has only one switching layer;
where the switching layer comprises a liquid-crystalline material which comprises a compound of a formula (I)

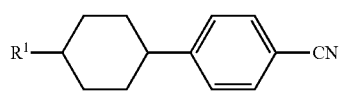

(I)

where $R^1$ is selected from alkyl groups having 1 to 10 C atoms and which comprises at least one dichroic dye which is selected from azo compounds, anthraquinones, benzothiadiazoles, diketopyrrolopyrroles and rylenes; and
where the switching layer has a dark switching state having low light transmission through the switching layer and a bright switching state having high light transmission through the switching layer, where the light transmittance $\tau_v$, in accordance with the EN410 standard, of the switching layer in the dark switching state of the device for light which is polarised parallel to the principal axis of absorption of the at least one dichroic dye is less than 3%; and
where the device contains only one polarisation layer, the polarisation layer linearly polarises light and the absorption axis of the polarisation layer which linearly polarises light is arranged, in the dark switching state of the switching layer, at an angle of 70°-110° to the principal axis of absorption of the at least one dichroic dye.

2. Optical switching device according to claim 1, wherein the polarisation layer is formed from a material which comprises one or more different organic dye compounds which have a common fixed spatial alignment.

3. Optical switching device according to claim 1, wherein the alignment directions of the two alignment layers which surround the switching layer enclose an angle of 0° to 270°.

4. Optical switching device according to claim 1, wherein the switching layer has a thickness between 2 and 15 µm.

5. Optical switching device according to claim 1, wherein the molecules of the liquid-crystalline material of the switching layer are twisted in a planar manner in at least one switching state of the device, where the twist has a value between 30° and 360° over the thickness of the switching layer.

6. Optical switching device according to claim 1, wherein at least one dichroic dye of the switching layer is fluorescent.

7. Optical switching device according to claim 1, wherein the switching layer comprises at least two different dichroic dyes each selected from azo compounds, anthraquinones, benzothiadiazoles, diketopyrrolopyrroles and rylenes.

8. Optical switching device according to claim 1, wherein the substrate layer which is adjacent to the polarisation layer consists of a polymer.

9. Optical switching device according to claim 1, wherein both substrate layers consist of a polymer.

10. Optical switching device according to claim 1, wherein the device is curved in space.

11. Optical switching device according to claim 1, which comprises a layer selected from adhesive layers and adhesive films between the polarisation layer and the adjacent substrate layer.

12. Window for buildings, containers or motor vehicles, which comprises an optical switching device according to claim 1.

13. A method for regulating the passage of sunlight from a sunlight-providing environment into a space substantially sealed off from the environment, which comprises providing an optical switching device according to claim 1 between the environment and the space.

14. Optical switching device comprising the following layer sequence:
    polarisation layer;
    substrate layer;
    electrically conductive transparent layer;
    alignment layer;
    switching layer;
    alignment layer;
    electrically conductive transparent layer; and
    substrate layer
where the device has only one switching layer;
where the switching layer comprises a liquid-crystalline material which comprises a compound of a formula (I)

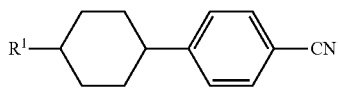 (I)

where $R^1$ is selected from alkyl groups having 1 to 10 C atoms and which comprises at least one dichroic dye which is selected from azo compounds, anthraquinones, benzothiadiazoles, diketopyrrolopyrroles and rylenes; and where the switching layer has a dark switching state having low light transmission through the switching layer and a bright switching state having high light transmission through the switching layer, where the light transmittance $\tau_v$, in accordance with the EN410 standard, of the switching layer in the dark switching state of the device for light which is polarised parallel to the principal axis of absorption of the at least one dichroic dye is less than 3%;

where the device contains only one polarisation layer; and where the device is curved in space.

15. Optical switching device according to claim 14, wherein the polarisation layer is formed from a material which comprises one or more different organic dye compounds which have a common fixed spatial alignment.

16. Optical switching device according to claim 14, wherein the polarisation layer linearly polarises light.

17. Optical switching device according to claim 16, wherein the absorption axis of the polarisation layer which linearly polarises light is arranged, in the dark switching state of the switching layer, at an angle of 70°-110° to the principal axis of absorption of the at least one dichroic dye.

18. Optical switching device according to claim 14, wherein the alignment directions of the two alignment layers which surround the switching layer enclose an angle of 0° to 270°.

19. Optical switching device according to claim 14, wherein the switching layer has a thickness between 2 and 15 µm.

20. Optical switching device according to claim 14, wherein the molecules of the liquid-crystalline material of the switching layer are twisted in a planar manner in at least one switching state of the device, where the twist has a value between 30° and 360° over the thickness of the switching layer.

21. Optical switching device according to claim 14, wherein at least one dichroic dye of the switching layer is fluorescent.

22. Optical switching device according to claim 14, wherein the switching layer comprises at least two different dichroic dyes each selected from azo compounds, anthraquinones, benzothiadiazoles, diketopyrrolopyrroles and rylenes.

23. Optical switching device according to claim 14, wherein the substrate layer which is adjacent to the polarisation layer consists of a polymer.

24. Optical switching device according to claim 14, wherein both substrate layers consist of a polymer.

25. Optical switching device according to claim 14, which comprises a layer selected from adhesive layers and adhesive films between the polarisation layer and the adjacent substrate layer.

26. Window for buildings, containers or motor vehicles, which comprises an optical switching device according to claim 14.

27. Window for buildings, containers or motor vehicles, which comprises an optical switching device according to claim 17.

28. A method for regulating the passage of sunlight from a sunlight-providing environment into a space substantially sealed off from the environment, which comprises providing an optical switching device according to claim 14 between the environment and the space.

* * * * *